US010861237B2

(12) United States Patent
Nourai et al.

(10) Patent No.: US 10,861,237 B2
(45) Date of Patent: Dec. 8, 2020

(54) MIXED REALITY SYSTEM WITH MULTI-SOURCE VIRTUAL CONTENT COMPOSITING AND METHOD OF GENERATING VIRTUAL CONTENT USING SAME

(71) Applicant: MAGIC LEAP, INC., Plantation, FL (US)

(72) Inventors: Reza Nourai, Danville, CA (US); Robert Blake Taylor, Porter Ranch, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/923,560

(22) Filed: Mar. 16, 2018

(65) Prior Publication Data
US 2018/0268610 A1 Sep. 20, 2018

Related U.S. Application Data

(60) Provisional application No. 62/473,131, filed on Mar. 17, 2017.

(51) Int. Cl.
*G06T 19/00* (2011.01)
*G06T 3/00* (2006.01)

(52) U.S. Cl.
CPC .......... *G06T 19/006* (2013.01); *G06T 3/0093* (2013.01)

(58) Field of Classification Search
CPC .... G06T 19/006; G06T 3/0093; G06T 15/205
See application file for complete search history.

(56) References Cited

U.S. PATENT DOCUMENTS

| 4,462,165 A | 7/1984 | Lewis |
| 5,280,265 A | 1/1994 | Kramer et al. |
| 5,583,974 A | 12/1996 | Winner et al. |

(Continued)

FOREIGN PATENT DOCUMENTS

| CA | 2358682 | 3/1994 |
| CN | 101093586 | 12/2007 |

(Continued)

OTHER PUBLICATIONS

Mark et al., Post-Rendering 3D Warping, I3D '97: Proceedings of 1997 Symposium on Interactive 3D Graphics, pp. 7-16, Apr. 1997, Providence, RI, USA, Copyright 1997, ACM 0-89791-884-3/97/04 (Year: 1997).*

(Continued)

*Primary Examiner* — Maurice L. McDowell, Jr.
*Assistant Examiner* — Donna J. Ricks
(74) *Attorney, Agent, or Firm* — Vista IP Law Group, LLP

(57) ABSTRACT

A computer implemented method for warping virtual content from two sources includes a first source generating first virtual content based on a first pose. The method also includes a second source generating second virtual content based on a second pose. The method further includes a compositor processing the first and second virtual content in a single pass. Processing the first and second virtual content includes generating warped first virtual content by warping the first virtual content based on a third pose, generating warped second virtual content by warping the second virtual content based on the third pose, and generating output content by compositing the warped first and second virtual content.

19 Claims, 14 Drawing Sheets

(56) References Cited

U.S. PATENT DOCUMENTS

| | | | |
|---|---|---|---|
| 5,592,401 A | 1/1997 | Kramer | |
| 5,684,498 A | 11/1997 | Welch et al. | |
| 5,784,115 A | 7/1998 | Bozdagi | |
| 5,930,741 A | 7/1999 | Kramer | |
| 6,377,401 B1 | 4/2002 | Bartlett | |
| 6,407,736 B1 | 6/2002 | Regan | |
| 6,701,296 B1 | 3/2004 | Kramer et al. | |
| 6,891,533 B1* | 5/2005 | Alcorn | G06T 15/005 345/419 |
| 7,375,529 B2 | 5/2008 | Dupuis et al. | |
| 7,443,154 B1 | 10/2008 | Merewether et al. | |
| 8,165,352 B1 | 4/2012 | Mohanty et al. | |
| 8,401,308 B2 | 3/2013 | Nakamura et al. | |
| 8,446,426 B2* | 5/2013 | Gonion | G06T 15/503 345/592 |
| 8,950,867 B2 | 2/2015 | Macnamara | |
| 9,013,505 B1 | 4/2015 | Thorton | |
| 9,160,727 B1 | 10/2015 | Saylor et al. | |
| 9,215,293 B2 | 12/2015 | Miller | |
| 9,417,452 B2 | 8/2016 | Schowengerdt et al. | |
| 9,465,129 B1 | 10/2016 | Olsson et al. | |
| 9,639,935 B1* | 5/2017 | Douady-Pleven | G06T 5/50 |
| 9,671,566 B2 | 6/2017 | Abovitz et al. | |
| 9,791,700 B2 | 10/2017 | Schowengerdt | |
| 9,814,430 B1 | 11/2017 | Berme et al. | |
| 9,874,749 B2 | 1/2018 | Bradski et al. | |
| 9,952,673 B2 | 4/2018 | Kramer et al. | |
| 2001/0043738 A1 | 11/2001 | Sawney et al. | |
| 2002/0033803 A1 | 3/2002 | Holzrichter et al. | |
| 2002/0180727 A1 | 12/2002 | Guckenberger et al. | |
| 2003/0092448 A1 | 5/2003 | Forstrom et al. | |
| 2003/0120448 A1 | 7/2003 | Moriya et al. | |
| 2003/0234823 A1 | 12/2003 | Sato et al. | |
| 2004/0140949 A1 | 7/2004 | Takagi | |
| 2004/0174337 A1 | 9/2004 | Kubota et al. | |
| 2004/0201857 A1 | 10/2004 | Foxlin | |
| 2005/0107870 A1 | 5/2005 | Wang et al. | |
| 2005/0156601 A1 | 7/2005 | Dupuis et al. | |
| 2006/0161871 A1 | 7/2006 | Hotelling et al. | |
| 2006/0253804 A1 | 11/2006 | Fukushima et al. | |
| 2007/0049374 A1 | 3/2007 | Ikeda et al. | |
| 2007/0072674 A1 | 3/2007 | Ohta et al. | |
| 2007/0126733 A1 | 6/2007 | Yang et al. | |
| 2007/0298883 A1 | 12/2007 | Feldman et al. | |
| 2008/0024523 A1 | 1/2008 | Tomite et al. | |
| 2008/0133521 A1 | 6/2008 | Podilchuk | |
| 2008/0275667 A1 | 11/2008 | Ohta | |
| 2008/0309884 A1 | 12/2008 | O'Dor et al. | |
| 2009/0005166 A1 | 1/2009 | Sato | |
| 2009/0051653 A1 | 2/2009 | Barney et al. | |
| 2009/0115406 A1 | 5/2009 | Anderson et al. | |
| 2009/0173886 A1 | 7/2009 | Chowdhury | |
| 2009/0184825 A1 | 7/2009 | Anderson | |
| 2010/0066676 A1 | 3/2010 | Kramer et al. | |
| 2010/0085423 A1 | 4/2010 | Lange | |
| 2010/0103205 A1 | 4/2010 | Lisaka et al. | |
| 2010/0141261 A1 | 7/2010 | Overby et al. | |
| 2010/0302152 A1 | 12/2010 | Kirigaya | |
| 2010/0309292 A1 | 12/2010 | Ho et al. | |
| 2011/0018874 A1 | 1/2011 | Hasselgreen et al. | |
| 2011/0025603 A1 | 2/2011 | Underkoffler et al. | |
| 2011/0184950 A1 | 7/2011 | Skaff et al. | |
| 2011/0199088 A1 | 8/2011 | Bittar et al. | |
| 2011/0238399 A1 | 9/2011 | Ophir et al. | |
| 2011/0248987 A1 | 10/2011 | Mitchell | |
| 2011/0298748 A1 | 12/2011 | Chen et al. | |
| 2012/0099800 A1 | 4/2012 | Llano et al. | |
| 2012/0117076 A1 | 5/2012 | Austermann et al. | |
| 2012/0194516 A1 | 8/2012 | Newcombe et al. | |
| 2012/0236030 A1 | 9/2012 | Border et al. | |
| 2012/0328196 A1 | 12/2012 | Kasahara et al. | |
| 2013/0084984 A1 | 4/2013 | Gagner et al. | |
| 2013/0117377 A1 | 5/2013 | Miller | |
| 2013/0128230 A1 | 5/2013 | Macnamara | |
| 2013/0169626 A1 | 7/2013 | Balan et al. | |
| 2013/0230211 A1 | 9/2013 | Tanabiki et al. | |
| 2013/0241773 A1 | 9/2013 | Laine | |
| 2013/0278635 A1 | 10/2013 | Maggiore | |
| 2013/0290222 A1 | 10/2013 | Gordo et al. | |
| 2013/0312009 A1 | 11/2013 | Kramer et al. | |
| 2013/0321462 A1 | 12/2013 | Salter et al. | |
| 2013/0346168 A1 | 12/2013 | Zhou et al. | |
| 2014/0006026 A1 | 1/2014 | Lamb et al. | |
| 2014/0011589 A1 | 1/2014 | Barney et al. | |
| 2014/0037140 A1 | 2/2014 | Benhimane et al. | |
| 2014/0062841 A1 | 3/2014 | Ishikawa et al. | |
| 2014/0075060 A1 | 3/2014 | Sharp et al. | |
| 2014/0139226 A1 | 5/2014 | Jaaskelainen et al. | |
| 2014/0145932 A1 | 5/2014 | Underkoffler et al. | |
| 2014/0176591 A1 | 6/2014 | Klein et al. | |
| 2014/0181587 A1 | 6/2014 | Sridharan et al. | |
| 2014/0195988 A1 | 7/2014 | Kramer et al. | |
| 2014/0212027 A1 | 7/2014 | Hallquist et al. | |
| 2014/0222409 A1 | 8/2014 | Efrat et al. | |
| 2014/0225822 A1 | 8/2014 | Underkoffler et al. | |
| 2014/0267420 A1 | 9/2014 | Schowengerdt et al. | |
| 2014/0267646 A1 | 9/2014 | Na'Aman et al. | |
| 2014/0285375 A1 | 9/2014 | Crain | |
| 2014/0298269 A1 | 10/2014 | Underkoffler et al. | |
| 2014/0306866 A1 | 10/2014 | Miller et al. | |
| 2014/0321702 A1 | 10/2014 | Schmalstieg | |
| 2014/0323148 A1 | 10/2014 | Schmalstieg et al. | |
| 2014/0325373 A1 | 10/2014 | Kramer et al. | |
| 2014/0354548 A1 | 12/2014 | Lee | |
| 2015/0002542 A1 | 1/2015 | Chan et al. | |
| 2015/0019651 A1 | 1/2015 | Kazi et al. | |
| 2015/0040074 A1 | 2/2015 | Hofmann et al. | |
| 2015/0077326 A1 | 3/2015 | Kramer et al. | |
| 2015/0092015 A1 | 4/2015 | Stafford | |
| 2015/0100380 A1 | 4/2015 | Jones, Jr. et al. | |
| 2015/0100593 A1 | 4/2015 | Underkoffler et al. | |
| 2015/0161476 A1 | 6/2015 | Kurz et al. | |
| 2015/0163345 A1 | 6/2015 | Cornaby et al. | |
| 2015/0172568 A1* | 6/2015 | Choe | H04N 1/486 348/164 |
| 2015/0177831 A1 | 6/2015 | Chan et al. | |
| 2015/0178554 A1 | 6/2015 | Kanaujia et al. | |
| 2015/0178939 A1 | 6/2015 | Bradski et al. | |
| 2015/0205126 A1 | 7/2015 | Schowengerdt | |
| 2015/0205364 A1 | 7/2015 | Underkoffler et al. | |
| 2015/0205388 A1 | 7/2015 | Osterhout | |
| 2015/0215611 A1 | 7/2015 | Wu et al. | |
| 2015/0221133 A1* | 8/2015 | Groten | G06K 9/00671 345/633 |
| 2015/0243080 A1 | 8/2015 | Steinbach et al. | |
| 2015/0262372 A1 | 9/2015 | Cardoso et al. | |
| 2015/0302652 A1 | 10/2015 | Miller et al. | |
| 2015/0310310 A1 | 10/2015 | Hesch | |
| 2015/0324198 A1 | 11/2015 | Alsup et al. | |
| 2015/0339857 A1 | 11/2015 | O'Connor et al. | |
| 2015/0346495 A1 | 12/2015 | Welch et al. | |
| 2015/0358539 A1 | 12/2015 | Catt | |
| 2015/0371082 A1 | 12/2015 | Csaszar et al. | |
| 2015/0373369 A1 | 12/2015 | Jalai et al. | |
| 2015/0379772 A1 | 12/2015 | Hoffman | |
| 2016/0005233 A1 | 1/2016 | Fraccaroli et al. | |
| 2016/0012643 A1 | 1/2016 | Kezele et al. | |
| 2016/0016752 A1 | 1/2016 | Helseth et al. | |
| 2016/0018896 A1 | 1/2016 | Kramer et al. | |
| 2016/0026253 A1 | 1/2016 | Bradski et al. | |
| 2016/0041048 A1 | 2/2016 | Blum et al. | |
| 2016/0147065 A1 | 5/2016 | Border et al. | |
| 2016/0171644 A1* | 6/2016 | Gruber | G06T 1/20 345/522 |
| 2016/0180151 A1 | 6/2016 | Philbin et al. | |
| 2016/0180592 A1 | 6/2016 | Bean et al. | |
| 2016/0189680 A1 | 6/2016 | Paquette | |
| 2016/0203624 A1 | 7/2016 | Anderson | |
| 2016/0210783 A1 | 7/2016 | Tomlin et al. | |
| 2016/0259032 A1 | 9/2016 | Hehn | |
| 2016/0259404 A1 | 9/2016 | Woods | |
| 2016/0262608 A1 | 9/2016 | Krueger | |
| 2016/0282619 A1 | 9/2016 | Oto | |
| 2016/0294958 A1 | 10/2016 | Zhang et al. | |

(56) References Cited

U.S. PATENT DOCUMENTS

| | | | |
|---|---|---|---|
| 2016/0299567 | A1 | 10/2016 | Crisler et al. |
| 2016/0378863 | A1 | 12/2016 | Shlens et al. |
| 2016/0379092 | A1 | 12/2016 | Kutliroff |
| 2017/0011555 | A1* | 1/2017 | Li .............................. G06T 1/60 |
| 2017/0032220 | A1 | 2/2017 | Medasani et al. |
| 2017/0076328 | A1 | 3/2017 | Suzuki |
| 2017/0098406 | A1 | 4/2017 | Kobayashi |
| 2017/0109916 | A1 | 4/2017 | Kurz et al. |
| 2017/0161853 | A1 | 6/2017 | Gossweiler et al. |
| 2017/0161919 | A1 | 6/2017 | Schroeder |
| 2017/0184387 | A1 | 6/2017 | Lefevre et al. |
| 2017/0205903 | A1 | 7/2017 | Miller et al. |
| 2017/0243324 | A1* | 8/2017 | Mierle .................... G06F 3/012 |
| 2017/0345398 | A1 | 11/2017 | Fuchs et al. |
| 2018/0039083 | A1 | 2/2018 | Miller et al. |
| 2018/0047332 | A1 | 2/2018 | Kuwahara |
| 2018/0107346 | A1 | 4/2018 | Wilson |
| 2018/0213359 | A1 | 7/2018 | Reinhardt et al. |
| 2018/0268518 | A1 | 9/2018 | Nourai et al. |
| 2018/0268519 | A1 | 9/2018 | Liebenow et al. |
| 2019/0015167 | A1* | 1/2019 | Draelos .................. A61B 34/25 |
| 2019/0056693 | A1 | 2/2019 | Gelman et al. |
| 2019/0155374 | A1 | 5/2019 | Miller et al. |
| 2020/0027194 | A1 | 1/2020 | Nourai et al. |

FOREIGN PATENT DOCUMENTS

| | | | |
|---|---|---|---|
| CN | 101530325 | | 9/2009 |
| CN | 103792661 | | 5/2014 |
| CN | 104011788 | | 8/2014 |
| EP | 2887311 | | 6/2015 |
| KR | 10-2014-0034252 | | 3/2014 |
| KR | 10-2016-0013939 | | 2/2016 |
| KR | 10-2016-0023888 | | 2/2016 |
| WO | WO 94/04938 | | 3/1994 |
| WO | WO 2009/091563 | * | 7/2009 ............ H04N 13/00 |
| WO | WO 2014/160342 | | 10/2014 |
| WO | WO 2015134958 | | 9/2015 |
| WO | WO 2016141373 | | 9/2016 |
| WO | WO 2017096396 | | 6/2017 |
| WO | WO 2017136833 | | 8/2017 |
| WO | WO 9720244 | | 12/2019 |
| WO | WO 2020/023383 | | 1/2020 |

OTHER PUBLICATIONS

PCT International Search Report and Written Opinion for International Appln. No. PCT/US18/22884, Applicant Magic Leap, Inc., forms PCT/ISA/210, 220, and 237, dated May 21, 2018 (13 pages).
Reply brief filed May 6, 2019 for U.S. Appl. No. 15/062,104.
Response to Extended European Search Report dated May 13, 2019 for EP Application No. 16759643.6.
Non Final Office action dated Jun. 17, 2019 for U.S. Appl. No. 15/924,011.
Tian et al., View Synthesis Techniques for 3D Video, Proc. SPIE 7443, Applications of Digital Image Processing XXXII, 74430T, Sep. 2009 (Year: 2009).
Final Office Action dated Jun. 21, 2019 for U.S. Appl. No. 15/369,646.
Response to Non-Final Office Action filed Jun. 21, 2019 for U.S. Appl. No. 15/924,078.
Response to Restriction Requirement filed Jul. 22, 2019 for U.S. Appl. No. 15/877,359.
Non-Final Office Action for U.S. Appl. No. 15/665,335 dated Apr. 22, 2019.
Response to Non-Final Office Action for U.S. Appl. No. 15/665,335 dated Jul. 22, 2019.
Response to Restriction Requirement filed Mar. 18, 2019 for U.S. Appl. No. 15/665,335.
PCT International Search Report and Written Opinion for International Patent Appln. No. PCT/US2017/044762 dated Oct. 5, 2017.
Response to Extended European Search Report dated Jul. 30, 2019 for European Application No. 16871733.8, (12 pages).
Final Office Action for U.S. Appl. No. 15/924,078 dated Aug. 9, 2019.
Response to Final Office Action and AFCP for U.S. Appl. No. 15/369,646, filed Aug. 21, 2019.
Response Non Final Office action filed Sep. 12, 2019 for U.S. Appl. No. 15/924,011.
Advisory Action dated Sep. 6, 2019 for U.S. Appl. No. 15/369,646.
RCE and Response to Final Office Action for U.S. Appl. No. 15/369,646, filed Sep. 19, 2019.
Office Action for Chinese Appln. No. 201680025479.1 dated Jul. 23, 2019, 16 pages w/English translation.
Response to Final Office Action and AFCP for U.S. Appl. No. 15/924,078, filed Oct. 9, 2019.
Non-Final Office Action for U.S. Appl. No. 14/641,376 dated Apr. 14, 2016.
Response to Non-Final office action filed Sep. 12, 2016 for U.S. Appl. No. 14/641,376.
Final Office Action for U.S. Appl. No. 14/641,376 dated Nov. 14, 2016.
Response to Final Office action filed Mar. 14, 2017 for U.S. Appl. No. 14/641,376.
PCT International Search Report and Written Opinion for International Appln. No. PCT/US15/19339, Applicant Magic Leap, Inc., Forms PCT/ISA/210, 220, and 237, dated Jun. 24, 2015 (10 pages).
PCT International Search Report and Written Opinion for International Appln. No. PCT/US16/21095, Applicant Magic Leap, Inc., forms PCT/ISA/210, 220, and 237, dated May 31, 2016 (12 pages).
PCT International Search Report and Written Opinion for International Appln. No. PCT/US16/65001, Applicant Magic Leap, Inc., forms PCT/ISA/210, 220, and 237, dated Feb. 16, 2017 (16 pages).
PCT International Search Report and Written Opinion for International Appln. No. PCT/US2017/016722, Applicant Magic Leap, Inc., forms PCT/ISA/210, 220, and 237, dated Apr. 14, 2017 (24 pages).
Notice of Allowance dated Aug. 14, 2017 for U.S. Appl. No. 14/641,376.
Preliminary Amendment filed Aug. 24, 2017 for U.S. Appl. No. 15/425,837.
Non-Final Office Action dated Dec. 6, 2017 for U.S. Appl. No. 15/062,104.
Voluntary Amendment for Canadian Appln. No. 2979560 filed Oct. 6, 2017, 24 pages.
Voluntary Amendment for Japanese Appln. No. 2017-546703 filed Nov. 7, 2017, 7 pages.
Response to Non-Final office action filed Mar. 6, 2018 for U.S. Appl. No. 15/062,104.
Final Office Action filed Apr. 30, 2018 for U.S. Appl. No. 15/062,104.
Coiliot, C., Moutoussamy, J., Boda, M., and Leroy, P.: New ferromagnetic core shapes for induction sensors, J. Sens. Sens. Syst., 3,1-8, https://doi.org/10.5194/jsss-3-1-2014, 2014.
Non-Final Office Action dated Apr. 5, 2018 for U.S. Appl. No. 15/425,837.
Response to Non-Final Office Action filed Jul. 5, 2018 for U.S. App. No. 15/425,837.
Pre appeal brief filed Aug. 30, 2018 for U.S. Appl. No. 15/062,104.
Notice of Allowance dated Sep. 6 2018 for U.S. Appl. No. 15/425,837.
Extended European Search Report dated Oct. 16, 2018 for EP Application No. 16759643.6.
Amendment After Allowance dated Nov. 15, 2018 for U.S. Appl. No. 15/425,837.
Non final Office Action dated Nov. 29, 2018 for U.S. Appl. No. 15/369,646.
Extended European Search Report dated Jan. 7, 2019 for EP Application No. 16871733.8.
Song Yafei et al.: Fast Estimation of Relative Poses for 6-DOF Image Localization, 2015 IEEE International Conference on Multimedia Big Data, IEEE; Apr. 20, 2015, pp. 156-163, XP033173496.
Ng Joe Yue-Hei et al.: Exploiting local features from deep networks for image retrieval, 2015 IEEE Conference on Computer Vision and Pattern recognition workshops (CVPRW), IEEE; Jun. 7, 2015, pp. 53-61, XP032795533.
Bay Herbert et al.: SURF: Speeded Up Robust Features, International Conference on Simulation, Modeling and Programming for

(56) References Cited

OTHER PUBLICATIONS

Autonomous Robots, Simpar 2010, Lecture Notes in Computer Science; Lect Notes Computer; May 7, 2006, pp. 404-417, XP047429677.
Alex Kendall et al.: PoseNet: A Convolutional Metwork for Real-Time 6-DOF Camera Relocalization, https://arxiv.org/pdf/1505.07427v3.pdf, Nov. 23, 2015; XP055536871.
Extended European Search Report dated Jan. 17, 2019 for EP Application No. 17748352.6.
Nair Rahul et al.: "A Survey on Time-of-Flight Stero Fusion", Oct. 9, 2015, Medical Image Computing and Computer Assisted Intervention—MICCAI 2015, 18th International Conference, Munich, Germany, Oct. 5-9, 2015; Proceedings; Lecture Notes in Computer Science; Lect Notes Computer; Springer International Publishing, CH, XP047148654.
Zhu J J et al.: Joint depth and alpha matte optimization via fusion of stero and time-of-flight sensor, 2009 IEEE Conference on Computer Vision and Pattern recognition (CVPR), IEEE; Jun. 20, 2009, pp. 453-460, XP002700137.
Amendment After Non-Final Office Action dated Feb. 28, 2019 for U.S. Appl. No. 15/369,646.
PCT International Search Report and Written Opinion for International Appln. No. PCT/US18/22993, Applicant Magic Leap, Inc., forms PCT/ISA/210, 220, and 237, dated Jun. 8, 2018 (13 pages).
PCT Invitation to Pay Additional Fees for International Appln. No. PCT/US18/23011, Applicant Magic Leap, Inc. dated May 25, 2018 (18 pages).
PCT International Search Report and Written Opinion for International Appln. No. PCT/US18/23011, Applicant Magic Leap, Inc. dated Jul. 23, 2018 (18 pages).
Non-Final Office Action for U.S. Appl. No. 15/924,078 dated Mar. 21, 2019.
1st Examination Report dated Oct. 1, 2019 for European Application No. 16759643.6.
Non-Final Office Action dated Oct. 21, 2019 for U.S. Appl. No. 15/877,359.
Final office action dated Oct. 22, 2019 for U.S. Appl. No. 15/924,011.
Advisory Action dated Oct. 22, 2019 for U.S. Appl. No. 15/924,078.
Non-Final Office Action dated Oct. 30, 2019 for U.S. Appl. No. 16/220,617.
RCE and Response to Final Office Action filed Nov. 11, 2019 for U.S. Appl. No. 15/924,078.
Non Final Office Action dated Nov. 8, 2019 for U.S. Appl. No. 15/369,646.
Final office action dated Aug. 9, 2019 for for U.S. Appl. No. 15/924,078.
Office Action for Israeli Appln. No. 254300 dated Oct. 27, 2019, 7 pages w/English translation.
Response to Office Action for Chinese Appln. No. 201680025479.1 filed Nov. 26, 2019, 9 pages w/English translation of claims.
Extended European Search Report dated Nov. 21, 2019 for European Application No. 18767086.4.
Extended European Search Report for European Appln. No. 17837488.0 dated Jul. 11, 2019 (10 pages).
Robert Earl Patterson, et al. "Low-Level Factors in Human Factors of Stereoscopic 3D Displays", ProQuest Ebook Central, Springer, London, Dec. 29, 2014. doi:10.1007/978-1-4471-6651-1_4, chapter 4.2; 4.3.
Jannick Rolland, et al. "The past, present and future of head-mounted display designs"; Nov. 8, 2004, Proc. SPIE 5638, p. 368.
RCE and Response to Final Office Action for U.S. Appl. No. 15/665,335, filed Dec. 4, 2019.
PCT International Search Report and Written Opinion for International Patent Appln. No. PCT/US2019/042819, dated Dec. 4, 2019 (12 pages).
PCT Invitation to Pay Additional Fees for International Patent Appln. No. PCT/US2019/042819, dated Sep. 18, 2019 (2 pages).
Lee, Y., et al., "Estimating Gaze Depth Using Multi-Layer Perceptron," Published by IEEE, retrived electronically on Apr. 12, 2019 (5 pages).
Extended European Search Report for European Appln. No. 18766694.6 dated Nov. 21, 2019 (9 pages).
Theohari S Theohari S et al. "The Magic of the Z-Buffer: A Survey", Journal of WSCG, Plzen, Czech Republic, Feb. 5, 2001, XP55640849.
Amir H. Behzadan et al: "Scalable 1-14 Algorithm for Resolving Incorrect Occlusion in Dynamic Augmented Reality Engineering Environments : Scalable algorithm for resolving incorrect occlusion", Computer-Aided Civil and Infrastructure Engineering, vol . 25, No. I, Jan. 1, 2010, pp. 3-19, XP55640847.
Breen D E et al: "Interactive occlusion 1-14 and automatic object placement for augmented reality", Computer Graphics Forum, Wiley-Blackwell Publishing Ltd, GB, vol . 15, No. 3, Aug. 26, 1996, pp. 11-22, XP002515919.
Mark WR et al: "Post-Rendering 3D 1-14 Warping", Proceedings of 1997 Symposium on Interactive 3 D Graphics Apr. 27-30, 1997 Providence, RI, USA; ACM, New York, NY, USA, Apr. 27 1997, pp. 7-16, XP000725355.
Amendment After Final Office Action for U.S. Appl. No. 15/924,011 dated Dec. 19, 2019.
Non-Final Office Action for U.S. Appl. No. 16/22,630 dated Dec. 26, 2019.
Non-Final Office Action for U.S. Appl. No. 15/924,078 dated Jan. 13, 2020.
Extended European Search Report for European Appln. No. 18742228.2 dated Jan. 13, 2020 (8 pages).
Amendment After non-final Office Action for U.S. Appl. No. 15/877,359 dated Jan. 21, 2020.
Notice of Allowance for U.S. Appl. No. 15/924,011 dated Jan. 23, 2020.
Response to Extended European Search Report for European Appln. No. 17837488.0 filed Jan. 28, 2020 (23 pages).
Amendment After non-final Office Action for U.S. Appl. No. 16/220,617 dated Jan. 30, 2020.
Response to Examination Report filed Feb. 11, 2020 for European Application No. 16759643.6.
Amendment After non-final Office Action for U.S. Appl. No. 15/369,646 dated Feb. 10, 2020.
Notice of Allowance for U.S. Appl. No. 16/220,617 dated Feb. 20, 2020.
Response to Office Action filed Feb. 20, 2020 for Israeli Patent Application No. 254300, (3 pages).
Foreign Office Action for Japanese Patent Appln. No. 2017-546703 dated Mar. 10, 2020.
Foreign Office Action for Israeli Patent Application No. 259766 dated Mar. 1, 2020.
Amendment After non-final Office Action for U.S. Appl. No. 15/924,078 dated Apr. 13, 2020.
Notice of Allowance for U.S. Appl. No. 15/369,646 dated Apr. 8, 2020.
Final Office Action for U.S. Appl. No. 15/877,359 dated Apr. 16, 2020.
Amendment After non-final Office Action for U.S. Appl. No. 16/220,630 dated Apr. 27, 2020.
Non-Final Office Action for U.S. Appl. No. 16/848,496 dated May 18, 2020.
Notice of Allowance for U.S. Appl. No. 15/924,078 dated May 18, 2020.
Foreign Office Action for CN Patent Appln. No. 201680025479.1 dated Apr. 7, 2020.
Jiang, P., etc., "Electro-magnetic Tracking System for Capsule-typed Telemetric Device", Optics and Precision Engineering, vol. 15, No. 8, pp. 1247-1252, Aug. 2007.
1st Examination Report dated Jun. 24, 2020 for New Zealand Patent Application No. 743271.
Foreign Office Action for CN Patent Appln. No. 201680025479.1 dated Jun. 18 2020.
Notice of Allowance for U.S. Appl. No. 16/220,630 dated Jun. 8, 2020.
Response to Extended European Search Report for European Appln. No. 18767086.4 dated Jun. 15, 2020 (84 pages).
Response to Extended European Search Report for European Appln. No. 18766694.6 dated Jun. 19, 2020 (78 pages).

(56) References Cited

OTHER PUBLICATIONS

1st Examiner's Report for AU European Patent Appln. No. 2016225963 dated Jul. 1, 2020.
Foreign Office Action Response for JP Patent Appln. No. 2017-546703 dated Jun. 1, 2020.
Extended European Search Report for EP Patent Appln. No. 18768030.1 dated Jun. 18, 2020.
Mark, W., et al., "Post-Rendering 3D Warping", Proceedings of 1997 Symposium on 3D Graphics, Apr. 27-30, 1997, Providence, RI, USA, pp. 7-ff, XP058285072.
Amendment Response to Non-Final Office Action for U.S. Appl. No. 16/848,496 dated Jul. 22, 2019.
Foreign Exam Report for NZ Patent Appln. No. 735465 dated Jul. 22, 2020.
1st Examination Report for NZ Patent Appln. No. 734200 dated Jun. 15, 2020.
Foreign Submission Reply for EP Patent Appln No. 18766694.6 dated Jun. 19, 2020.
Foreign Examination Report for EP Patent Appln. No. 17837488.0 dated Jul. 22, 2020.
Response to Extended European Search Report for European Appln. No. 18742228.2 dated Aug. 10, 2020 (86 pages).
Foreign Office Action for KR Patent Appln. No. 10-2019-7006281 dated Aug. 28, 2020.
Notice of Allowance for U.S. Appl. No. 16/848,496 dated Aug. 24, 2020.
Non-Final Office Action for U.S. Appl. No. 16/945,613 dated Sep. 3, 2020.
Notice of Allowance for U.S. Appl. No. 16/220,630 dated Sep. 11, 2020.
Notice of Allowance for U.S. Appl. No. 15/369,646 dated Sep. 22, 2020.
Notice of Allowance for U.S. Appl. No. 16/220,630 dated Sep. 23, 2020.
Non-Final Office Action for U.S. Appl. No. 16/809,346 dated Oct. 16, 2020.
Foreign Office Action for JP Patent Application No. 2019-505238 dated Sep. 10, 2020 (no translation available).

* cited by examiner

MIXED REALITY SYSTEM WITH MULTI-SOURCE VIRTUAL CONTENT COMPOSITING AND METHOD OF GENERATING VIRTUAL CONTENT USING SAME

CROSS-REFERENCE TO RELATED APPLICATIONS

The present application claims the benefit of priority to U.S. Provisional Application Ser. No. 62/473,131, filed on Mar. 17, 2017, which is hereby incorporated by reference in its entirety. This application includes subject matter similar to the subject matter described in U.S. Provisional Application Ser. No. 62/472,985, filed on Mar. 17, 2017, which is hereby incorporated by reference in its entirety.

FIELD OF THE INVENTION

The present disclosure relates to mixed reality systems with virtual content compositing, and methods for generating a mixed reality experience including composite virtual content using same.

BACKGROUND

Modern computing and display technologies have facilitated the development of "mixed reality" (MR) systems for so called "virtual reality" (VR) or "augmented reality" (AR) experiences, wherein digitally reproduced images or portions thereof are presented to a user in a manner wherein they seem to be, or may be perceived as, real. A VR scenario typically involves presentation of digital or virtual image information without transparency to actual real-world visual input. An AR scenario typically involves presentation of digital or virtual image information as an augmentation to visualization of the real-world around the user (i.e., transparency to real-world visual input). Accordingly, AR scenarios involve presentation of digital or virtual image information with transparency to the real-world visual input.

Various optical systems generate images at various depths for displaying MR (VR and AR) scenarios. Some such optical systems are described in U.S. Utility patent application Ser. No. 14/555,585 filed on Nov. 27, 2014, the contents of which are hereby expressly and fully incorporated by reference in their entirety, as though set forth in full.

MR systems typically employ wearable display devices (e.g., head-worn displays, helmet-mounted displays, or smart glasses) that are at least loosely coupled to a user's head, and thus move when the user's head moves. If the user's head motions are detected by the display device, the data being displayed can be updated to take the change in head pose (i.e., the orientation and/or location of user's head) into account.

As an example, if a user wearing a head-worn display device views a virtual representation of a virtual object on the display device and walks around an area where the virtual object appears, the virtual object can be rendered for each viewpoint, giving the user the perception that they are walking around an object that occupies real space. If the head-worn display device is used to present multiple virtual objects, measurements of head pose can be used to render the scene to match the user's dynamically changing head pose and provide an increased sense of immersion.

Head-worn display devices that enable AR provide concurrent viewing of both real and virtual objects. With an "optical see-through" display, a user can see through transparent (or semi-transparent) elements in a display system to view directly the light from real objects in an environment. The transparent element, often referred to as a "combiner," superimposes light from the display over the user's view of the real world, where light from the display projects an image of virtual content over the see-through view of the real objects in the environment. A camera may be mounted onto the head-worn display device to capture images or videos of the scene being viewed by the user.

Current optical systems, such as those in MR systems, optically render virtual content. Content is "virtual" in that it does not correspond to real physical objects located in respective positions in space. Instead, virtual content only exist in the brain (e.g., the optical centers) of a user of the head-worn display device when stimulated by light beams directed to the eyes of the user. In application rich environments, 3-D optical systems may simultaneously render virtual objects generated by multiple sources/applications.

Some optical systems may include a compositing software/system that receives outputs from multiple sources/applications. The compositing system then "warps" (i.e., transforms the frame of reference) and composites/combines the received outputs for display in a single frame of reference (i.e., that of the display system/viewer; the "display frame of reference"). Warping or transforming change the way that virtual objects are presented. This approach takes the originally rendered virtual objects, and shifts the way that the virtual objects are presented to attempt to display those virtual objects from a different perspective.

Some compositing software/systems composite/combine the warped virtual content outputs in a number of processing passes, corresponding to the number of sources/applications providing outputs to be composited. In each pass, output from one source/application is transformed to the display frame of reference. After the various outputs are transformed into the same frame of reference, the warped outputs can be composited/combined. However, this multi-pass system for warping and compositing output from multiple sources/applications may be computationally expensive (resulting in processor related system limitations) and time-consuming (resulting in system latency).

SUMMARY

In one embodiment, a computer implemented method for warping virtual content from two sources includes a first source generating first virtual content based on a first pose. The method also includes a second source generating second virtual content based on a second pose. The method further includes a compositor processing the first and second virtual content in a single pass. Processing the first and second virtual content includes generating warped first virtual content by warping the first virtual content based on a third pose, generating warped second virtual content by warping the second virtual content based on the third pose, and generating output content by compositing the warped first and second virtual content.

In one or more embodiments, the first virtual content includes first image information at an X, Y location, a first brightness, and/or a first color. The second virtual content may include second image information at the X, Y location, a second brightness, and/or a second color.

In one or more embodiments, compositing the warped first and second virtual content includes depth testing the warped first and second virtual content. Depth testing the first and second virtual content may include determining a first depth of the warped first virtual content based on the third pose, determining a second depth of the warped second virtual content based on the third pose, and comparing the first and second depths based on the third pose.

In one or more embodiments, warping the first virtual content based on the third pose includes applying a first transformation to the first virtual content to generate the warped first virtual content. Warping the second virtual content based on the third pose may include applying a second transformation to the second virtual content to generate the warped second virtual content.

In one or more embodiments, the first source is a first application. The second source may be a second application different from the first application. The compositor may be a raster operations unit.

In one or more embodiments, the method also includes the compositor sending the output content to a display unit, and the display unit displaying an image to a user based on the output content. The display unit may be a projector. The first virtual content may be a pixel of a first virtual object. The second virtual content may be a pixel of a second virtual object.

In another embodiment, a system for warping virtual content from two sources includes a warping unit to receive first and second virtual content from first and second sources, and generate respective first and second warped virtual content therefrom. The warping unit includes a pose estimator and a transform unit. The system also includes a compositing unit to process the first and second warped virtual content in a single pass, the compositing unit comprising a blending unit. The system further includes a database to temporarily store warped virtual content.

In still another embodiment, a computer program product is embodied in a non-transitory computer readable medium, the computer readable medium having stored thereon a sequence of instructions which, when executed by a processor causes the processor to execute a method for warping virtual content from two sources. The method includes a first source generating first virtual content based on a first pose. The method also includes a second source generating second virtual content based on a second pose. The method further includes a compositor processing the first and second virtual content in a single pass. Processing the first and second virtual content includes generating warped first virtual content by warping the first virtual content based on a third pose, generating warped second virtual content by warping the second virtual content based on the third pose, and generating output content by compositing the warped first and second virtual content.

Additional and other objects, features, and advantages of the disclosure are described in the detail description, figures and claims.

BRIEF DESCRIPTION OF THE DRAWINGS

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosures briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which.

DETAILED DESCRIPTION

Figure 1:
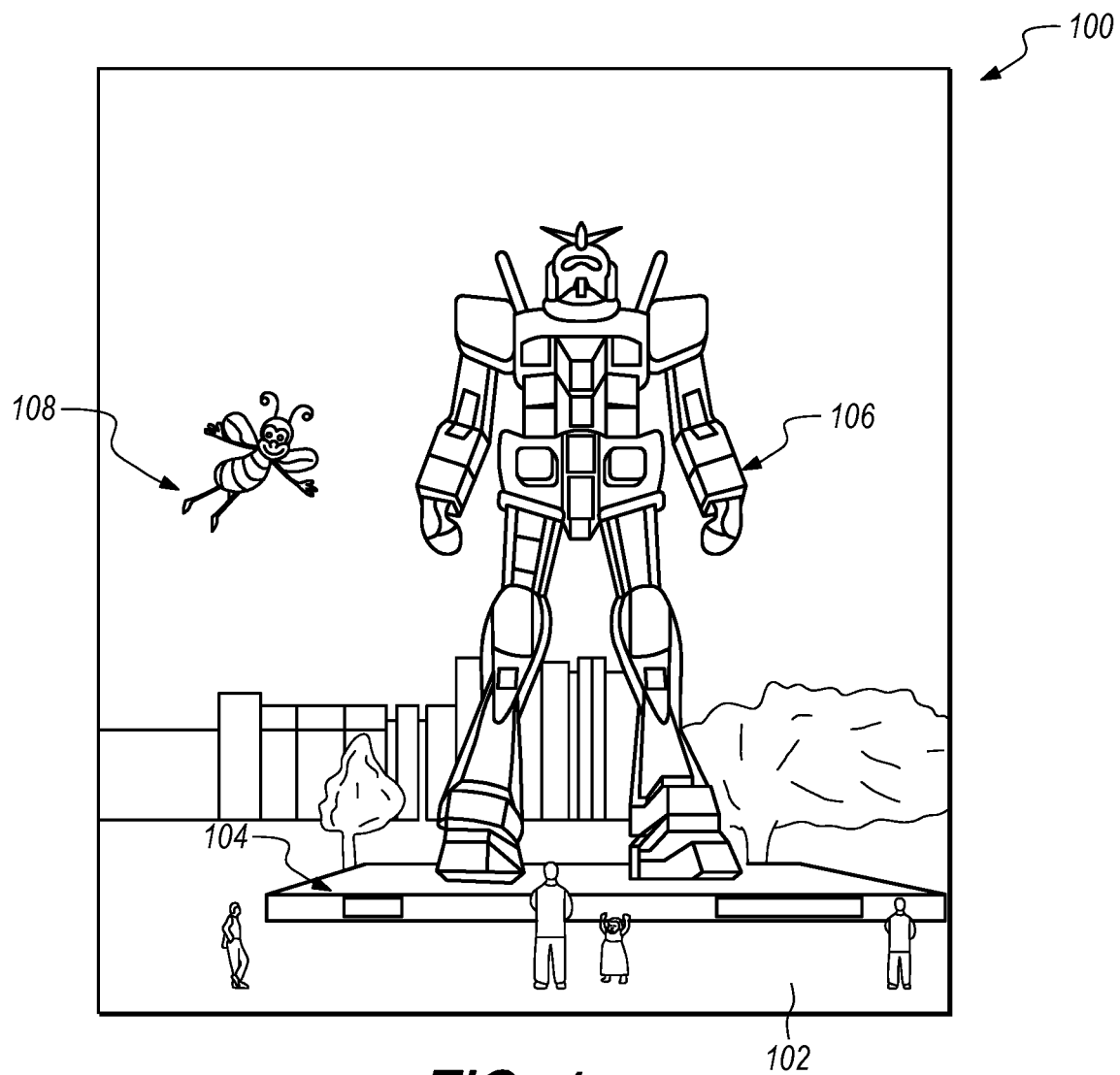
FIG. 1 depicts a user's view of augmented reality (AR) through a wearable AR user device, according to some embodiments.

Various embodiments of the disclosure are directed to systems, methods, and articles of manufacture for warping and compositing virtual content from multiple applications in a single embodiment or in multiple embodiments. Other objects, features, and advantages of the disclosure are described in the detailed description, figures, and claims.

Various embodiments will now be described in detail with reference to the drawings, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

The virtual content warping and compositing systems may be implemented independently of mixed reality systems, but some embodiments below are described in relation to AR systems for illustrative purposes only. Further, the virtual content warping and compositing systems described herein may also be used in an identical manner with VR systems.

Summary of Problems and Solutions

When optical systems simultaneously render virtual content generated by multiple sources/applications, the multiple applications may generate respective virtual content using different poses specific to the respective applications (e.g., due to head movement between application reach or renderings, or different application frames of reference). These poses may be different from each other and from a pose of the display system that will display composite virtual content. Consequently, the compositing software/system of the optical system must first warp or transform the virtual content generated by the multiple applications into a display frame of reference of the display system/viewer. Only after transformation can the various warped virtual content be composited into a single composite virtual content for display.

For example, a first application may output first virtual content, which may be a chess game. A second application may output second virtual content, which may be a movie. Some compositing software/systems warp and composite/combine the first and second virtual content in two processing passes. In the first pass, the first virtual content (e.g., the chess game) may be warped/transformed into the display frame of reference and stored in a buffer. In the second pass, the second virtual content (e.g., the movie) may be warped/transformed into the same display frame of reference and stored in a buffer. After the first and second virtual content are warped into the display frame of reference, the warped first and second virtual content can be read from the buffer(s) and composited/combined. For instance, if respective pixels of the warped first and second virtual content would be displayed on the same pixel of the display (i.e., colliding pixels), a depth test is performed on the respective portions and the closer virtual content is displayed (assuming that the content is opaque).

Figure 5A:
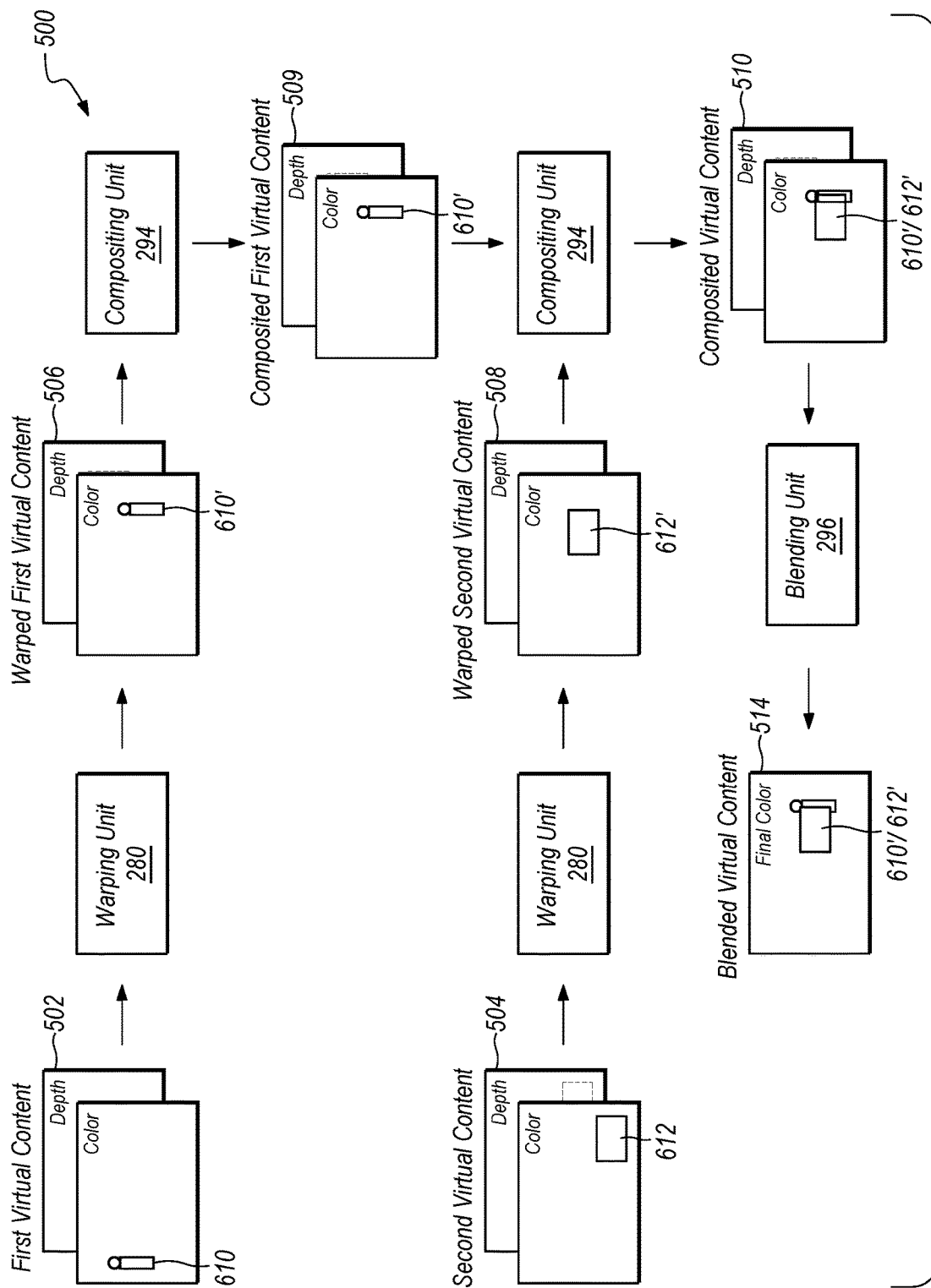
FIGS. 5A and 5B depict a method for warping virtual content from two sources, according to some embodiments.
Figure 5B:
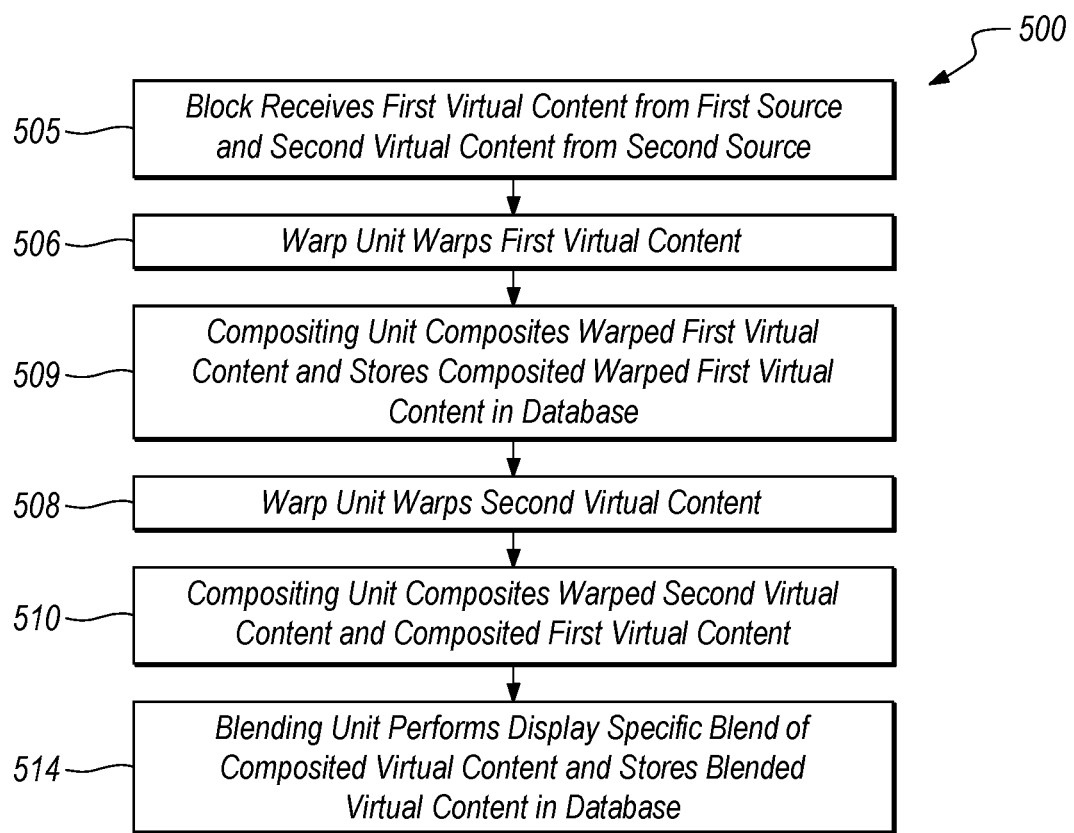

FIGS. 5A and 5B depict a method 500 for compositing virtual content in two passes, according to some embodiments. At step 502, a first source generates first virtual content 610 based on a first pose. The first virtual content 610 is sent to a warping unit 280 of a block 290, which receives the first virtual content 610.

At step 506, the warping unit 280 (e.g., a pose estimator 282 and a transform unit 284 of the warping unit 280 of the block 290) warps (e.g., transforms) the first virtual content 610 as generated by the first application to generate warped first virtual content 610' (note the difference in the position of the first virtual content 610 and the warped first virtual content 610' in steps 502 and 506, respectively). This first warped virtual content 610' is sent to a compositing unit 294 of the block 290.

At step 509, the compositing unit 294 composites the warped first virtual content 610' to form the composited first virtual content. Because there is no data previously written to the composited virtual content, compositing the warped first virtual content 610' may be accomplished by writing the warped first virtual content 610' to a database 292.

At step 504, a second source generates second virtual content 612 based on a second pose. The second virtual content 612 is sent to the warping unit 280, which receives the second virtual content 612.

At step 508, the warping unit 280 (e.g., the pose estimator 282 and the transform unit 284 of the warping unit 280 of the block 290) warps (e.g., transforms) the second virtual content 612 as generated by the second application to generate warped second virtual content 612' (note the difference in the position of the second virtual content 612 and the warped second virtual content 612' in steps 504 and 508, respectively). This warped second virtual content 612' is sent to the compositing unit 294.

At step 510, the compositing unit 294 composites the warped second virtual content 612' and the composited first virtual content 610' to form the composited virtual content 610'/612'. Compositing the warped second virtual content 612' and the composited first virtual content 610' may result in overlap areas as shown at 510 (see overlap between the warped first virtual content 610' and the warped second virtual content 612').

At step 514, a blender (e.g., a blending unit 296 of the compositing unit 294 of the block 290) resolves the overlap between the warped first virtual content 610' and the warped second virtual content 612' (see resolved overlap area between the warped first virtual content 610' and the warped second virtual content 612') to form the blended virtual content 610'/612'. The blending unit 296 may resolve the overlap using depth testing. The blending unit 296 may store the blended virtual content 610'/612' in the database 292.

This two pass system and method 500 for warping and compositing output from two applications may be computationally expensive and time-consuming. The computational expense and time required may increase with an increasing number of applications for which output/virtual content must be warped and composited for display. The increased time requirements of current compositing software/systems with an increasing number of applications may not be compatible with real-time systems such as some mixed reality systems. Further, the increased computational expense of current compositing software/systems with an increasing number of applications may manifest in size, power, heat and other processing related limitations that may not be compatible with portable systems such as some mixed reality systems.

In order to address these limitations, the systems described herein warp and composite virtual content outputs from multiple applications in a single pass. Each virtual content output is warped based on the pose used to generate the virtual content output and the pose of the "display frame of reference." Compositing the warped virtual content outputs includes depth testing to resolve conflicting warped virtual content outputs from different sources for display in a particular area in the display field of view.

Illustrative Mixed Reality Scenario and System

The description that follows pertains to an illustrative augmented reality system with which the compositing system may be practiced. However, it is to be understood that the embodiments also lends themselves to applications in other types of display systems (including other types of mixed reality systems), and therefore the embodiments are not to be limited to only the illustrative system disclosed herein.

Mixed reality (e.g., VR or AR) scenarios often include presentation of virtual content (e.g., images and sound) corresponding to virtual objects in relationship to real-world objects. For example, referring to FIG. 1, an augmented reality (AR) scene 100 is depicted wherein a user of AR technology sees a real-world, physical, park-like setting 102 featuring people, trees, buildings in the background, and a real-world, physical concrete platform 104. In addition to these items, the user of the AR technology also perceives that they "sees" a virtual robot statue 106 standing upon the physical concrete platform 104, and a virtual cartoon-like avatar character 108 flying by which seems to be a personification of a bumblebee, even though these virtual objects 106, 108 do not exist in the real-world. The virtual robot statue 106 and the virtual avatar character 108 may be generated by different applications operatively coupled to an AR system. These applications may provide virtual content generated/rendered based on different poses. The AR system will have to warp and composite the warped virtual content before display. Compositing includes depth testing to resolve conflicting warped virtual content (e.g., if a portion of the virtual avatar character 108 occludes a portion of the virtual robot statue 106).

In a similar manner, VR scenarios can also include virtual content from multiple sources/applications. Like AR scenarios, VR scenarios must also account for the poses used to generate/render the virtual content. Accurately warping and compositing the virtual content to the AR/VR display frame of reference and compositing the warped virtual content can improve the AR/VR scenarios, or at least not detract from the AR/VR scenarios.

The description that follows pertains to an illustrative AR system with which the disclosure may be practiced. However, it is to be understood that the disclosure also lends itself to applications in other types of augmented reality and virtual reality systems, and therefore the disclosure is not to be limited to only the illustrative system disclosed herein.

Figure 2A:
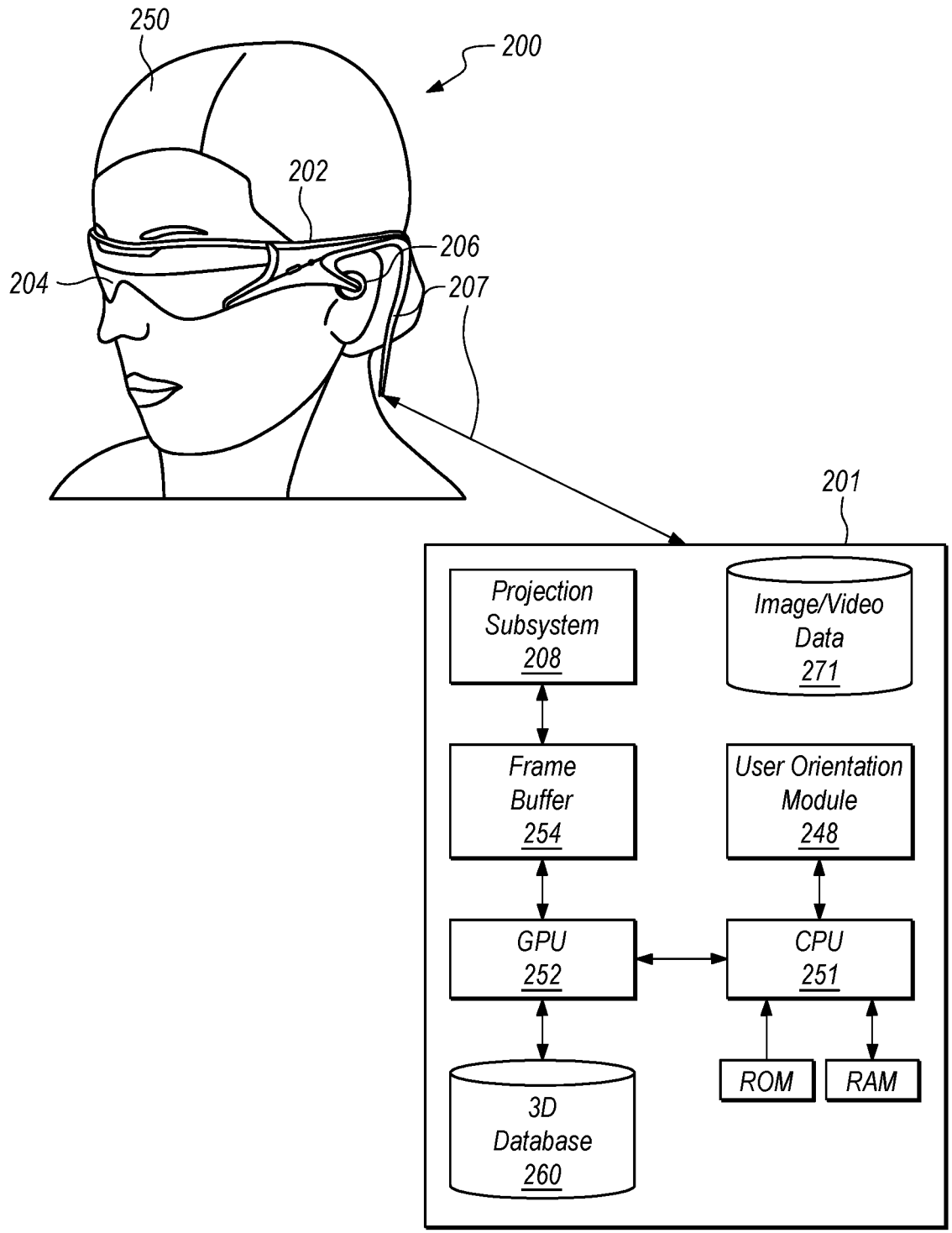
FIGS. 2A-2D schematically depict AR systems and subsystems thereof, according to some embodiments.

Referring to FIG. 2A, illustrates an augmented reality (AR) system 200, according to some embodiments. The AR system 200 may be operated in conjunction with a projection subsystem 208, providing images of virtual objects intermixed with physical objects in a field of view of a user 250. This approach employs one or more at least partially transparent surfaces through which an ambient environment including the physical objects can be seen and through which the AR system 200 produces images of virtual objects. The projection subsystem 208 is housed in a control subsystem 201 operatively coupled to a display system/subsystem 204 through a link 207. The link 207 may be a wired or wireless communication link.

For AR applications, it may be desirable to spatially position various virtual objects relative to respective physical objects in the field of view of the user 250. The virtual objects may take any of a large variety of forms, having any variety of data, information, concept, or logical construct capable of being represented as an image. Non-limiting examples of virtual objects may include: a virtual text object, a virtual numeric object, a virtual alphanumeric object, a virtual tag object, a virtual field object, a virtual chart object, a virtual map object, a virtual instrumentation object, or a virtual visual representation of a physical object.

The AR system 200 includes a frame structure 202 worn by the user 250, the display system 204 carried by the frame structure 202, such that the display system 204 is positioned in front of the eyes of the user 250, and a speaker 206 incorporated into or connected to the display system 204. In the illustrated embodiment, the speaker 206 is carried by the frame structure 202, such that the speaker 206 is positioned adjacent (in or around) the ear canal of the user 250 (e.g., an earbud or headphone).

The display system 204 is designed to present the eyes of the user 250 with photo-based radiation patterns that can be comfortably perceived as augmentations to the ambient environment including both two-dimensional and three-dimensional content. The display system 204 presents a sequence of frames at high frequency that provides the perception of a single coherent scene. To this end, the display system 204 includes the projection subsystem 208 and a partially transparent display screen through which the projection subsystem 208 projects images. The display screen is positioned in a field of view of the user's 250 field of view between the eyes of the user 250 and an ambient environment.

In some embodiments, the projection subsystem 208 takes the form of a scan-based projection device and the display screen takes the form of a waveguide-based display into which the scanned light from the projection subsystem 208 is injected to produce, for example, images at single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (e.g., one layer is within the cone of confusion of an adjacent layer). Additionally or alternatively, picture elements may be blended across two or more layers to increase perceived continuity of transition between layers in the light field, even if those layers are more sparsely stacked (e.g., one layer is outside the cone of confusion of an adjacent layer). The display system 204 may be monocular or binocular. The scanning assembly includes one or more light sources that produces the light beam (e.g., emits light of different colors in defined patterns). The light source may take any of a large variety of forms, for instance, a set of RGB sources (e.g., laser diodes capable of outputting red, green, and blue light) operable to respectively produce red, green, and blue coherent collimated light according to defined pixel patterns specified in respective frames of pixel information or data. Laser light provides high color saturation and is highly energy efficient. The optical coupling subsystem includes an optical waveguide input apparatus, such as for instance, one or more reflective surfaces, diffraction gratings, mirrors, dichroic mirrors, or prisms to optically couple light into the end of the display screen. The optical coupling subsystem further includes a collimation element that collimates light from the optical fiber. Optionally, the optical coupling subsystem comprises an optical modulation apparatus configured for converging the light from the collimation element towards a focal point in the center of the optical waveguide input apparatus, thereby allowing the size of the optical waveguide input apparatus to be minimized. Thus, the display subsystem 204 generates a series of synthetic image frames of pixel information that present an undistorted image of one or more virtual objects to the user. Further details describing display subsystems are provided in U.S. Utility patent application Ser. No. 14/212,961, entitled "Display System and Method", and Ser. No. 14/331,218, entitled "Planar Waveguide Apparatus With Diffraction Element(s) and Subsystem Employing Same", the contents of which are hereby expressly and fully incorporated by reference in their entirety, as though set forth in full.

The AR system 200 further includes one or more sensors mounted to the frame structure 202 for detecting the position (including orientation) and movement of the head of the user 250 and/or the eye position and inter-ocular distance of the user 250. Such sensor(s) may include image capture devices, microphones, inertial measurement units (IMUs), accelerometers, compasses, GPS units, radio devices, gyros and the like. For example, in one embodiment, the AR system 200 includes a head worn transducer subsystem that includes one or more inertial transducers to capture inertial measures indicative of movement of the head of the user 250. Such devices may be used to sense, measure, or collect information about the head movements of the user 250. For instance, these devices may be used to detect/measure movements, speeds, acceleration and/or positions of the head of the user 250. The position (including orientation) of the head of the user 250 is also known as a "head pose" of the user 250.

The AR system 200 of FIG. 2A may include one or more forward facing cameras. The cameras may be employed for any number of purposes, such as recording of images/video from the forward direction of the system 200. In addition, the cameras may be used to capture information about the environment in which the user 250 is located, such as information indicative of distance, orientation, and/or angular position of the user 250 with respect to that environment and specific objects in that environment.

The AR system 200 may further include rearward facing cameras to track angular position (the direction in which the eye or eyes are pointing), blinking, and depth of focus (by detecting eye convergence) of the eyes of the user 250. Such eye tracking information may, for example, be discerned by projecting light at the end user's eyes, and detecting the return or reflection of at least some of that projected light.

The augmented reality system 200 further includes a control subsystem 201 that may take any of a large variety of forms. The control subsystem 201 includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs). The control subsystem 201 may include a digital signal processor (DSP), a central processing unit (CPU) 251, a graphics processing unit (GPU) 252, and one or more frame buffers 254. The CPU 251 controls overall operation of the system, while the GPU 252 renders frames (i.e., translating a three-dimensional scene into a two-dimensional image) and stores these frames in the frame buffer(s) 254. While not illustrated, one or more additional integrated circuits may control the reading into and/or reading out of frames from the frame buffer(s) 254 and operation of the display system 204. Reading into and/or out of the frame buffer(s) 254 may employ dynamic addressing, for instance, where frames are over-rendered. The control subsystem 201 further includes a read only memory (ROM) and a random access memory (RAM). The control subsystem 201 further includes a three-dimensional database 260 from which the GPU 252 can access three-dimensional data of one or more scenes for rendering frames, as well as synthetic sound data associated with virtual sound sources contained within the three-dimensional scenes.

The augmented reality system 200 further includes a user orientation detection module 248. The user orientation module 248 detects the instantaneous position of the head of the user 250 and may predict the position of the head of the user 250 based on position data received from the sensor(s). The user orientation module 248 also tracks the eyes of the user 250, and in particular the direction and/or distance at which the user 250 is focused based on the tracking data received from the sensor(s).

Figure 2B:
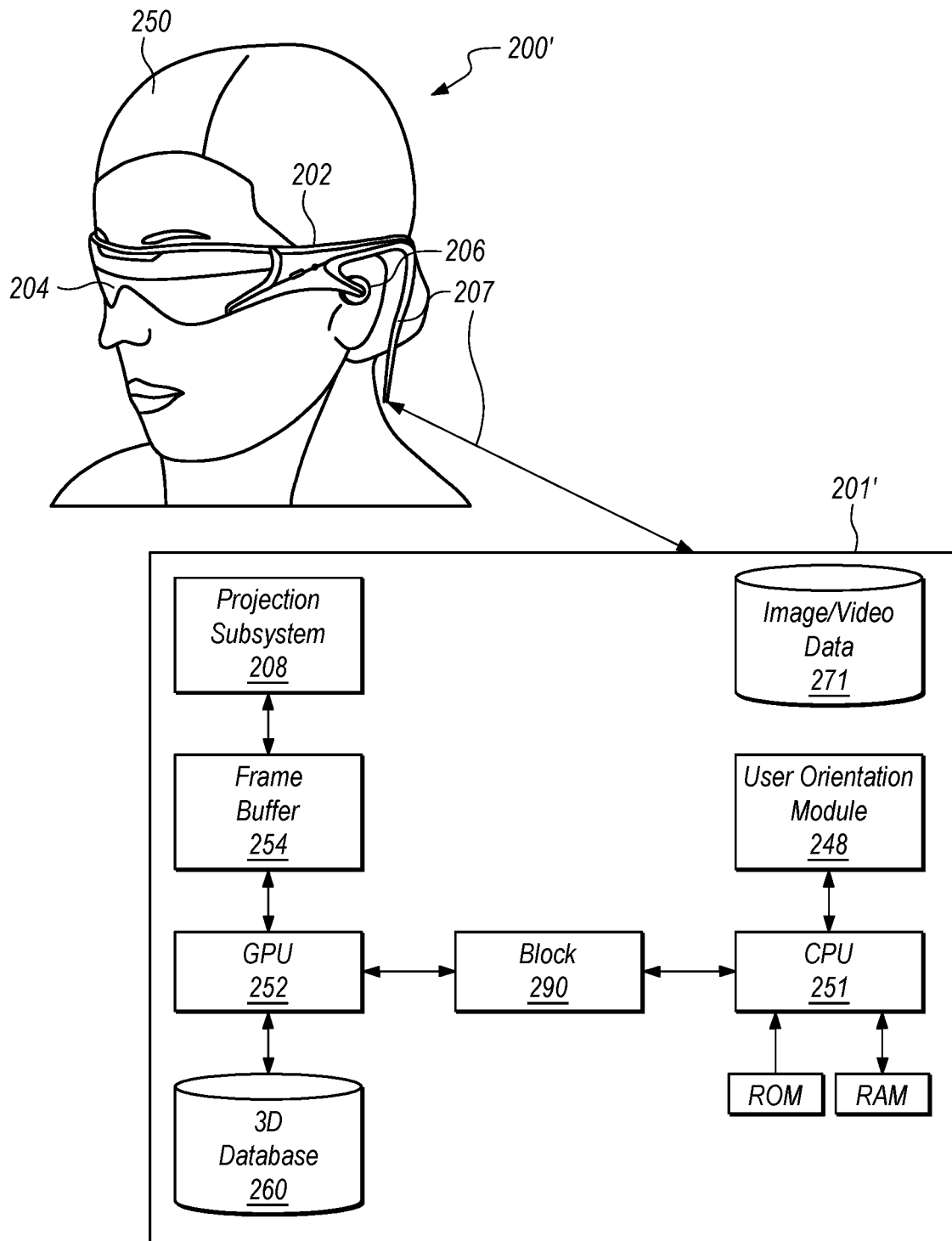

FIG. 2B depicts an AR system 200', according to some embodiments. The AR system 200' depicted in FIG. 2B is similar to the AR system 200 depicted in FIG. 2A and describe above. For instance, AR system 200' includes a frame structure 202, a display system 204, a speaker 206, and a control subsystem 201' operatively coupled to the display system 204 through a link 207. The control subsystem 201' depicted in FIG. 2B is similar to the control subsystem 201 depicted in FIG. 2A and describe above. For instance, control subsystem 201' includes a projection subsystem 208, an image/video database 271, a user orientation module 248, a CPU 251, a GPU 252, a 3D database 260, ROM and RAM.

Figure 2C:
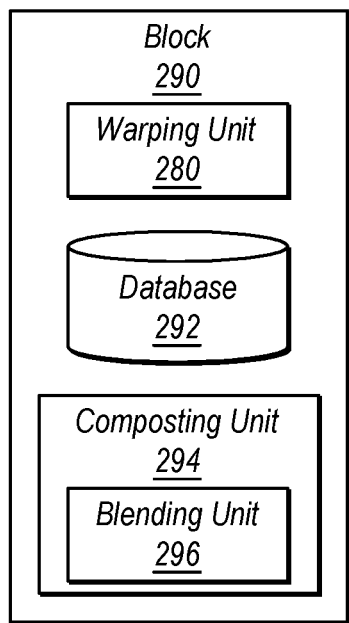
Figure 2D:
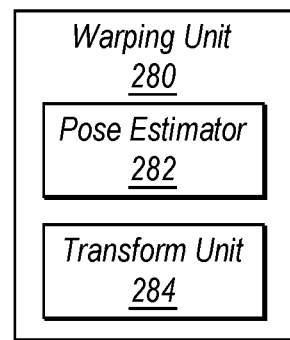

The difference between the control subsystem 201', and thus the AR system 200', depicted in FIG. 2B from the corresponding system/system component depicted in FIG. 2A, is the presence of block 290 in the control subsystem 201' depicted in FIG. 2B. The block 290 is a separate warping block that is independent from either the GPU 252 or the CPU 251. As illustrated in FIG. 2C, the block 290 includes a warping unit 280, a database 292, and a compositing unit 294. The compositing unit 294 includes a blending unit 296. As illustrated in FIG. 2D, the warping unit 280 includes a pose estimator 282 and transform unit 284.

The various processing components of the AR systems 200, 200' may be contained in a distributed subsystem. For example, the AR systems 200, 200' include a local processing and data module (i.e., the control subsystem 201, 201') operatively coupled, such as by a wired lead or wireless connectivity 207, to a portion of the display subsystem 204. The local processing and data module may be mounted in a variety of configurations, such as fixedly attached to the frame structure 202, fixedly attached to a helmet or hat, embedded in headphones, removably attached to the torso of the user 250, or removably attached to the hip of the user 250 in a belt-coupling style configuration. The AR systems 200, 200' may further include a remote processing module and remote data repository operatively coupled, such as by a wired lead or wireless connectivity to the local processing and data module, such that these remote modules are operatively coupled to each other and available as resources to the local processing and data module. The local processing and data module may comprise a power-efficient processor or controller, as well as digital memory, such as flash memory, both of which may be utilized to assist in the processing, caching, and storage of data captured from the sensors and/or acquired and/or processed using the remote processing module and/or remote data repository, possibly for passage to the display system 204 after such processing or retrieval. The remote processing module may comprise one or more relatively powerful processors or controllers configured to analyze and process data and/or image information. The remote data repository may comprise a relatively large-scale digital data storage facility, which may be available through the internet or other networking configuration in a "cloud" resource configuration. In one embodiment, all data is stored and all computation is performed in the local processing and data module, allowing fully autonomous use from any remote modules. The couplings between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless, with the exception of the optical fiber(s).

Illustrative Graphics Processing Unit

Figure 3:
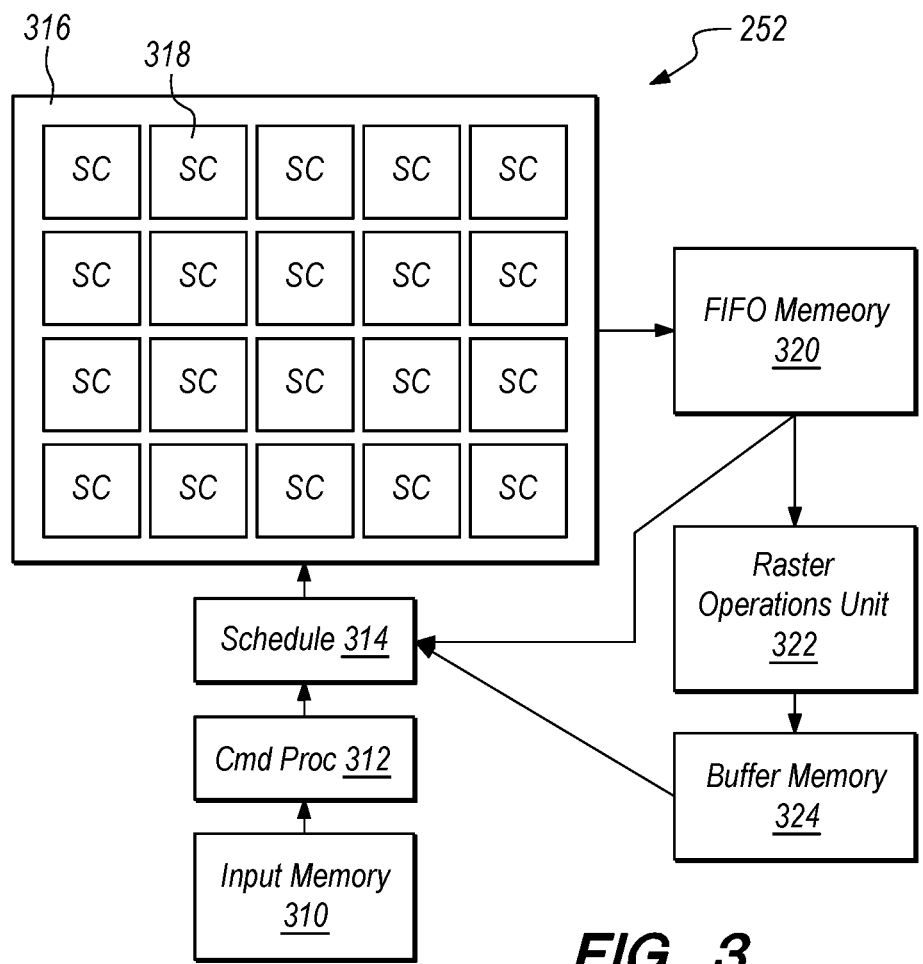
FIG. 3 schematically depicts a graphics processing unit (GPU), according to some embodiments.
Figure 4:
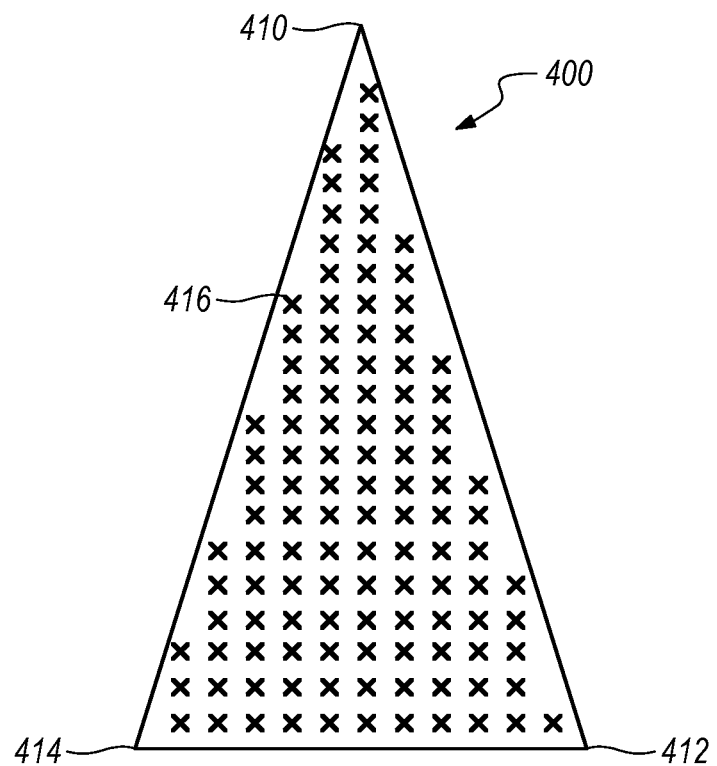
FIG. 4 depicts a virtual object stored as a primitive, according to some embodiments.

FIG. 3 schematically depicts an exemplary graphics processing unit (GPU) 252 to warp virtual content from one or more sources to a common frame of reference and to composite the warped virtual content, according to some embodiment. The GPU 252 includes an input memory 310 to store virtual content from the one or more sources. In some embodiments, the virtual content is stored as a primitive (e.g., a triangle 400 in FIG. 4). The GPU 252 also includes a command processor 312, which (1) receives/reads the virtual content from the input memory 310, (2) divides the virtual content into scheduling units, and (3) sends the scheduling units along the rendering pipeline in waves or warps for parallel processing. The GPU 252 further includes a scheduler 314 to (1) receive the scheduling units from the command processor 312, and (2) determine whether the "new work" from the command processor 312 or "old work" returning from downstream in the rendering pipeline (described below) should be sent down the rendering pipeline at any particular time. In effect, the scheduler 914 determines the sequence in which the GPU 252 processes various input data.

The GPU 252 includes a GPU cores 316, where each GPU core 316 has a number of parallel executable cores/units ("shader cores") 318 for processing the scheduling units in parallel. The command processor 312 divides the virtual content into a number equal to the number of shader cores 318 (e.g., 32). The GPU 251 also includes a "First In First Out" ("FIFO") memory 320 to receive output from the GPU core 316. From the FIFO memory 320, the output may be routed back to the scheduler 314 as "old work" for insertion into the rendering pipeline additional processing by the GPU core 316.

The GPU 252 further includes a Raster Operations Unit ("ROP") 322 that receives output from the FIFO memory 320 and rasterizes the output for display. For instance, primitives of virtual content may be stored as the coordinates of vertices of triangles. After processing by the GPU core 316 (during which the three vertices 410, 412, 414 of the triangle 400 of FIG. 4 may be warped), the ROP 322 determines which pixels 416 are inside of the triangle 400 defined by three vertices 410, 412, 414 and fills in those pixels 416 in the virtual content. The ROP 322 may also perform depth testing on the virtual content.

The GPU 252 also includes a buffer memory 324 to receive the output (e.g., warped virtual content) of the ROP 322. The output from the buffer memory 324 may be routed back to the scheduler 314 as "old work" for insertion into the rendering pipeline additional processing by the GPU core 316, or for display in the corresponding pixels of a display system. The GPU cores 316 first processes the vertices 410, 412, 414 of the triangles 400, then it processes the pixels 416 inside of the triangles 400.

Virtual Content Compositing Systems and Methods

In image processing without head pose changes and/or input from one or more sources, the results of the processing by the GPU 252 are color/brightness values and depth values at respective X, Y values (e.g., at each pixel). However with head pose changes and/or input from one or more sources, virtual content from various sources may overlap at a pixel. In some methods for resolving conflicting virtual content, virtual content from each source is warped and stored. Then any conflicting warped virtual content is depth tested against each other to determine the warped virtual content closest to the user, which is used in composited virtual content to resolve the conflict. As described above, this multi-pass warping and compositing process may be computationally expensive and slow, making it difficult to use with portable display systems, such as mixed reality systems.

Figure 5C:
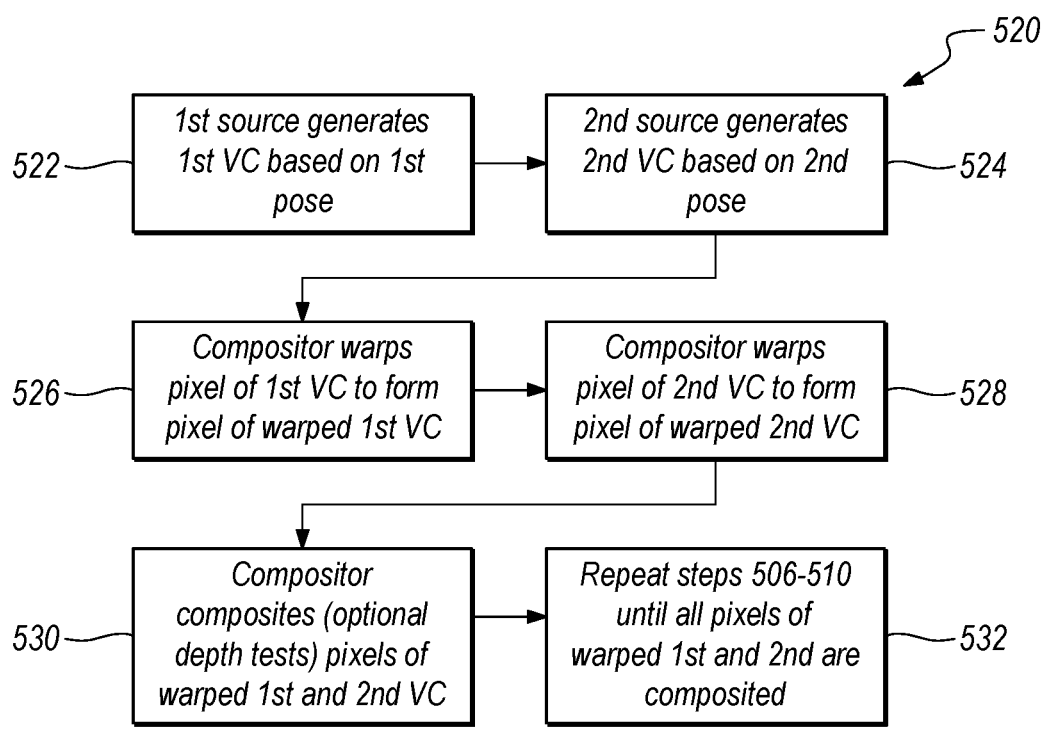
FIGS. 5C, 5D, and 5E depict methods for warping virtual content from two sources, according to some embodiments.
Figure 6:
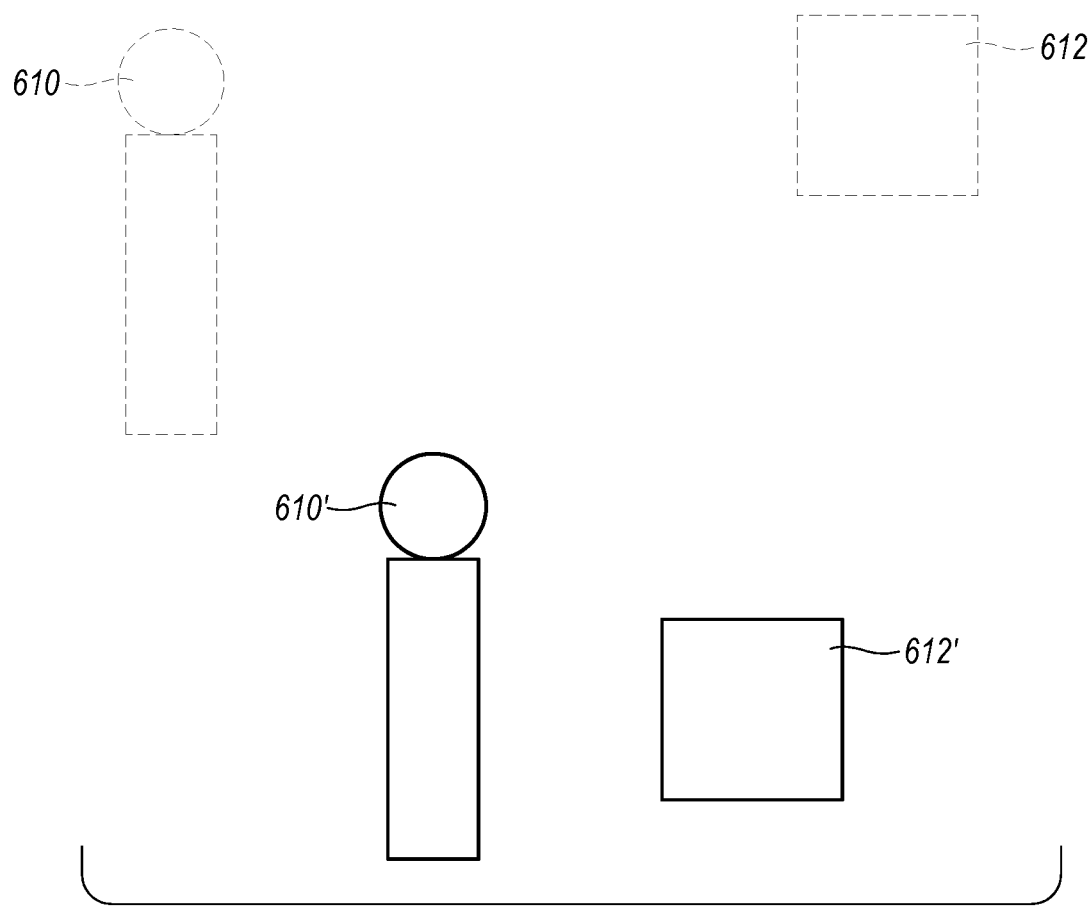
FIGS. 6-8 illustrate various aspects of warping virtual content, according to some embodiments.

FIG. 5C depicts a method 520 for compositing virtual content in a single pass, according to some embodiments. At step 522, a first source generates first virtual content (e.g., the first virtual content 610) based on a first pose corresponding to a first source frame of reference. For instance, the first virtual content 610 may be a chess piece. At step 524, a second source generates second virtual content (e.g., second virtual content 612) based on a second pose corresponding to a second source frame of reference. For instance, the second virtual content 612 may be a cube. While FIG. 6 shows a chess piece 610 and a cube 612 in a common frame of reference (e.g., the display frame of reference), where the chess piece 610 and the cube 612 were generated using different poses (e.g., the chess piece 610 generated using a first pose and the cube 612 generated using a second pose) corresponding to the different sources (e.g., applications) that generated the chess piece 610 and the cube 612.

At step 526, a compositor (e.g., the GPU 252 and/or the pose estimator 282 and the transform unit 284 of the warping unit 280 of the block 290) warps (e.g., transforms) a pixel of the first virtual content 610 as generated by the first application to generate a pixel of a warped first virtual content 610'. The compositor can choose the pixel of the first virtual content 610 to correspond to a particular pixel in the output content/displayed image (e.g., the upper left pixel). The compositor can choose the pixel of the first virtual content to warp by analyzing the target pixel in the output content and the transformation to be applied to the second virtual content 612 (based on the first pose corresponding to the first source frame of reference and a third pose corresponding to an output/display frame of reference). The compositor may warp the first virtual content (e.g., pixels of the first virtual content 610) by performing a first Fourier transformation on the first virtual content 610 using the first pose and the third pose.

The third pose may be predicted/estimated (e.g., by the pose estimator 282 of the warping unit 280) to coincide with the pose when the composite warped virtual content is to be displayed. The third pose may be called a viewer's pose, a unified pose, an aligned pose, a composite pose, and/or a coherent predicted pose. The third pose may be predicted/estimated, such that when first and second warped virtual content are overlaid on top of each other and the resulting image is projected, the image is accurate relative to the viewer's actual head pose at the time of projection. The third pose may correspond to an output/display frame of reference.

At step 528, the compositor (e.g., GPU 252 and/or the pose estimator 282 and the transform unit 284 of the warping unit 280 of the block 290) warps a pixel of the second virtual content 612 as generated by the second application to generate a pixel of a warped second virtual content 612'. The compositor can choose the pixel of the second virtual content 612 to correspond to a particular pixel in the output content/display image, for example, so that the pixel of the warped second virtual content 612' corresponds to the pixel of the warped first virtual content 610' from step 526. The compositor can choose the pixel of the second virtual content 612 to warp by analyzing the position of the warped first virtual content 610' from step 526 and the transformation to be applied to the second virtual content 612 (based on the second pose corresponding to the second source frame of reference and the third pose corresponding to the output/display frame of reference). The compositor may warp the second virtual content by performing a second Fourier transformation on the second virtual content 610 using the second pose and the third pose. The first Fourier transformation may be different from the second Fourier transformation due to differences between the first and second poses.

At step 530, the compositor (e.g., the ROP 322 of GPU 252 and/or compositing unit 294 and blending unit 296 of block 290) composites the pixels of the warped first and second virtual content 610', 612' to form output content for display. In some embodiments, for example as illustrated in FIG. 6, if the pixels of the warped first and second virtual content 610', 612' do not overlap, they are stored in a buffer (e.g., buffer memory 924 and/or database 292) as temporary pixels of the output content.

Figure 7:
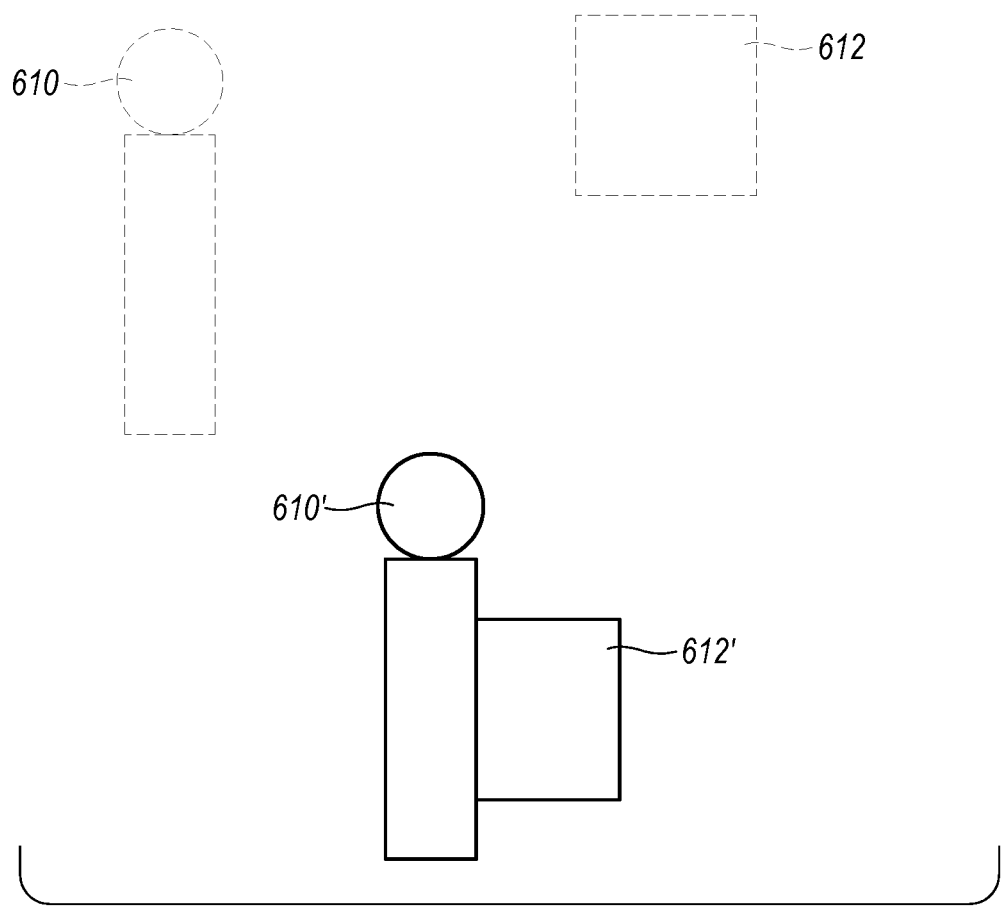
Figure 8:
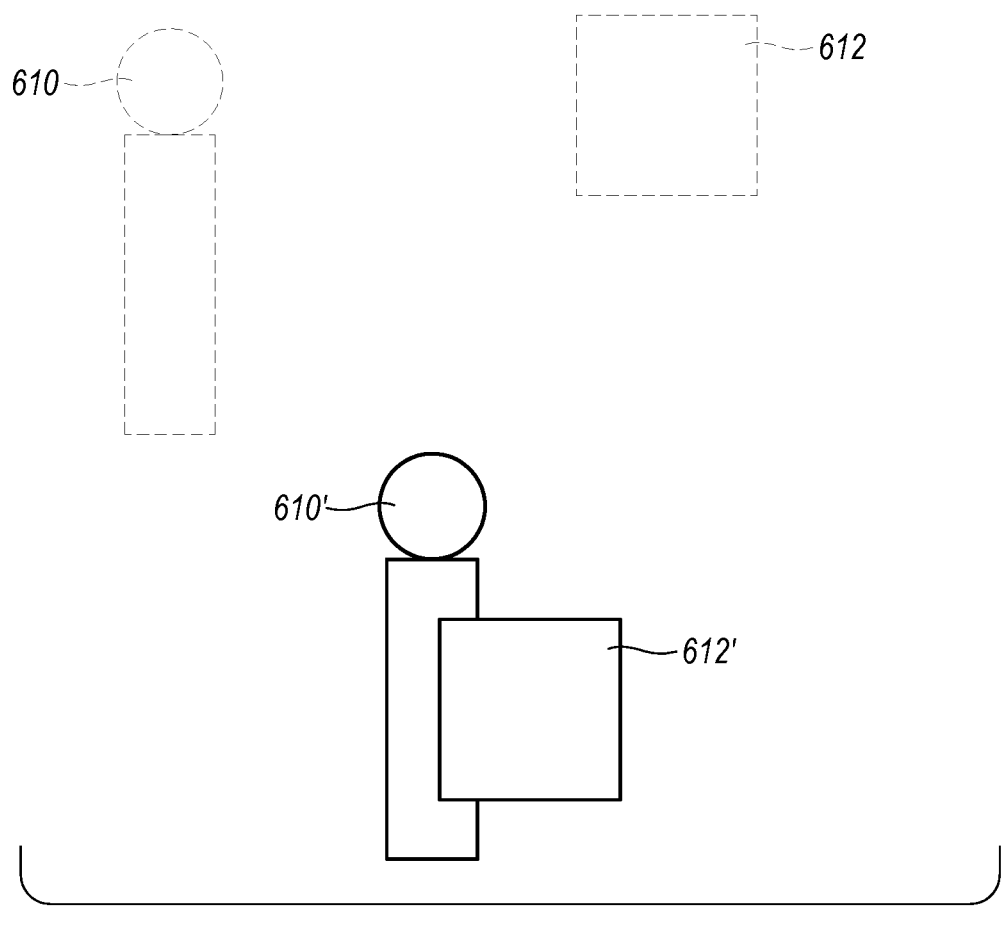

In some embodiments, during composition, pixels of the warped first and second virtual content 610', 612' are assigned to the same pixel in the output content as each other or as other pixels already stored in the buffer as temporary pixels of the output content. In other words, the pixels "collide," as illustrated in FIGS. 7 and 8. In such cases, the compositor (e.g., the ROP 322 of GPU 252 and/or compositing unit 294 and blending unit 296 of block 290) compares the depth information of the conflicting pixels of the warped first and second virtual content 610', 612' to identify the pixel closer to the user. After the pixels have been transformed, they are in the same display frame of reference, and depth testing is possible. The closer pixel is then written to the buffer (e.g., buffer memory 924 and/or database 292) as the temporary pixel at that location of the output content. Details regarding blending of colliding pixels are described in U.S. Provisional Application Ser. No. 62/472,985, which has been previously incorporated by reference. In FIG. 7, the warped first virtual content 610' is closer to the user than the warped second virtual content 612'. As such, when pixels of the warped first and second virtual content 610', 612' collide, the pixels of the warped first virtual content 610' are displayed in the output content. In FIG. 8, the warped second virtual content 612' is closer to the user than the warped first virtual content 610'. As such, when pixels of the warped first and second virtual content 610', 612' collide, the pixels of the warped second virtual content 612' are displayed in the output content.

At step 532, the pixel by pixel processing/reconciliation in steps 526-530 is repeated until the entire warped first and second virtual content 610', 612' have been com posited into the output content for display. Warping, corn positing and depth testing pixels of virtual content from multiple sources in a single pass reduces the processor burden and the time required to composite the virtual content to form output content for display.

Figure 5D:
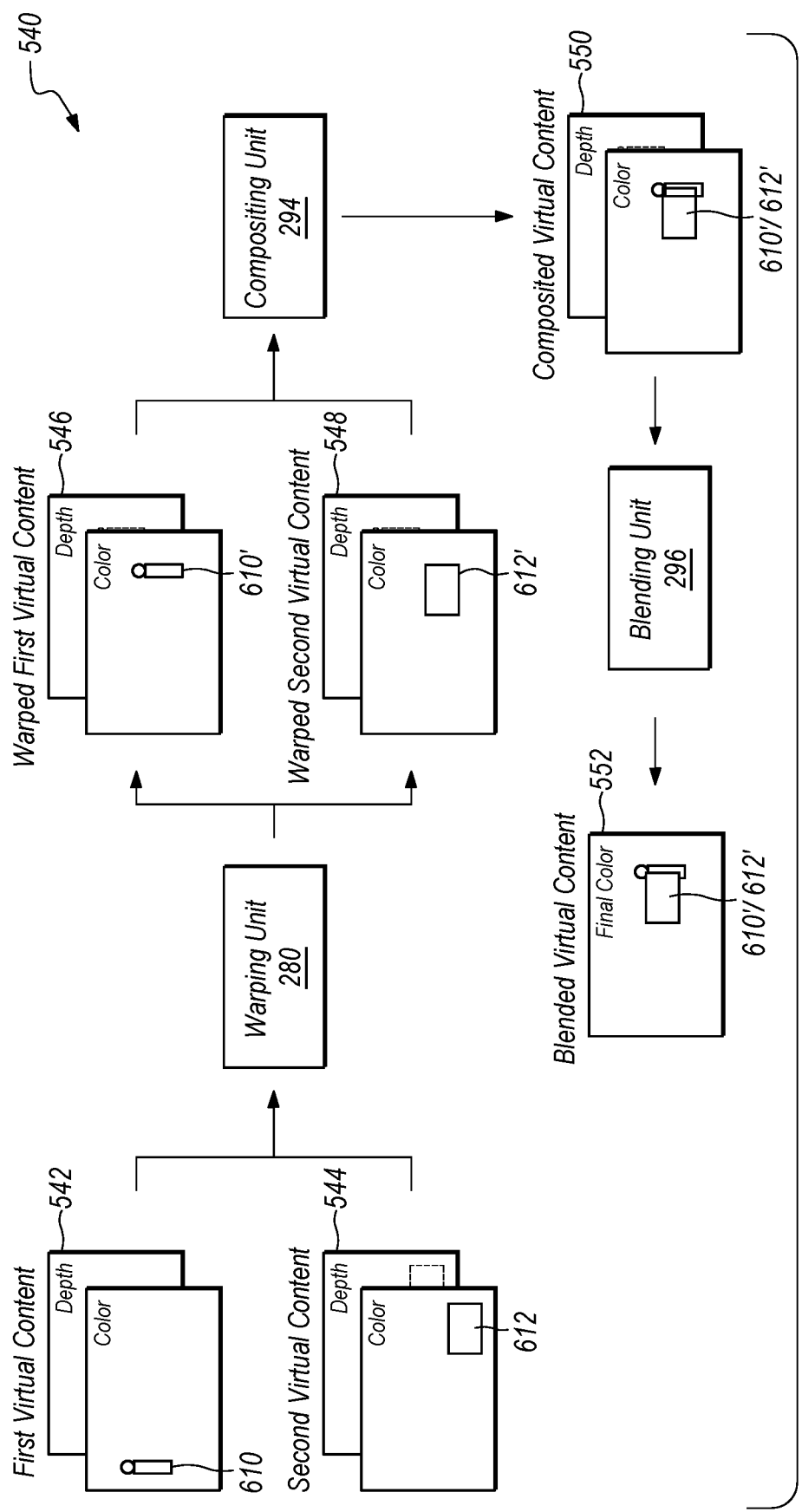
Figure 5E:
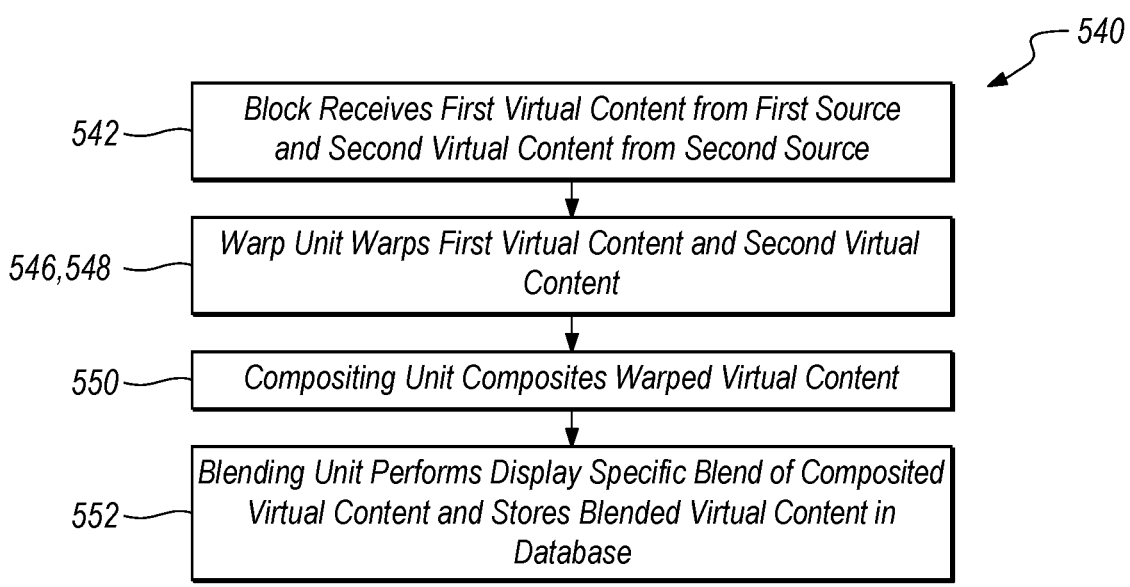

FIGS. 5D and 5E depict a method 540 for compositing virtual content in a single pass, according to some embodiments. At step 542, a first source generates first virtual content 610 based on a first pose corresponding to a first source frame of reference. At step 544, a second source generates second virtual content 612 based on a second pose corresponding to a second source frame of reference. The first and second virtual content 610, 612 are sent to a warping unit 280 of a block 290, which receives the first and second virtual content 610, 612.

At step 546, a warping unit (e.g., the pose estimator 282 and the transform unit 284 of the warping unit 280 of the block 290) warps (e.g., transforms) the first virtual content 610 as generated by the first application to generate warped first virtual content 610' (note the difference in the position of the first virtual content 610 and the warped first virtual content 610' in 542 and 546, respectively). At step 548, a warping unit (e.g., the pose estimator 282 and the transform unit 284 of the warping unit 280 of the block 290) warps (e.g., transforms) the second virtual content 612 as generated by the second application to generate warped second virtual content 612' (note the difference in the position of the second virtual content 612 and the warped second virtual content 612' in 544 and 548, respectively). The warped first and second virtual content 610', 612' may be generated using a pixel-by-pixel warping method described above with respect to the method 520 depicted in FIG. 5C. In some embodiments, the warping unit performs steps 546 and 548 parallelly (at substantially the same time). In some embodiments, the warping unit performs steps 546 and 548 serially (one after another), in any desired order. Pixels of the warped first and second virtual content 610', 612' are sent to the compositing unit 294 of the block 290.

At step 550, a compositor (e.g., the compositing unit 294 of the block 290) composites the warped first and second virtual content 610', 612' as described above with respect to the method 520 depicted in FIG. 5C to form the composited virtual content 610'/612'. The composited virtual content 610'/612' may have overlap areas as shown at 550 (see overlap between the first and second virtual content 610', 612').

At step 552, a blender (e.g., the blending unit 296 of the compositing unit 294 of the block 290) resolves the overlap between the warped first and second virtual content 610', 612' (see resolved overlap area between first and second virtual content 610',612') to form the blended virtual content 610'/612'. The blender may resolve the overlap using the method described above with respect to the method 520 depicted in FIG. 5C. The blender may store the blended virtual content 610'/612' in the database 292.

As described above, the methods 520, 540 depicted in FIGS. 5C-5E may also be executed on a separate warping block 290 that is independent from either any GPU 252 or CPU 251. In some embodiments, the methods 520, 540 depicted in FIGS. 5C-5E may be executed on a CPU 251. In some embodiments, the methods 520, 540 depicted in FIGS. 5C-5E may be executed on various combinations/sub-combinations of GPU 252, CPU 251, and separate warping block 290. The methods 520, 540 depicted in FIGS. 5C-5E describe image processing pipelines that can be executed using various execution models according to system resource availability at a particular time.

The first virtual content (e.g., the chess piece) 610 and the second virtual content (e.g., the cube) 612 are shown in phantom in FIGS. 6-8 to indicate that the first virtual content 610 and the second virtual content 612 as generated by the first and second applications are not in the display frame of reference. Only after the compositing system has warped the first virtual content 610 and the second virtual content 612 are the warped first virtual content 610' and the warped second virtual content 612' shown in solid lines.

While the method 500 depicted in FIG. 5 composites first and second virtual content 610, 612 from two applications, in other embodiments, three or more applications may generate three or more respective virtual content that must be composited (and possibly depth tested) to form the output content for display.

System Architecture Overview

Figure 9:
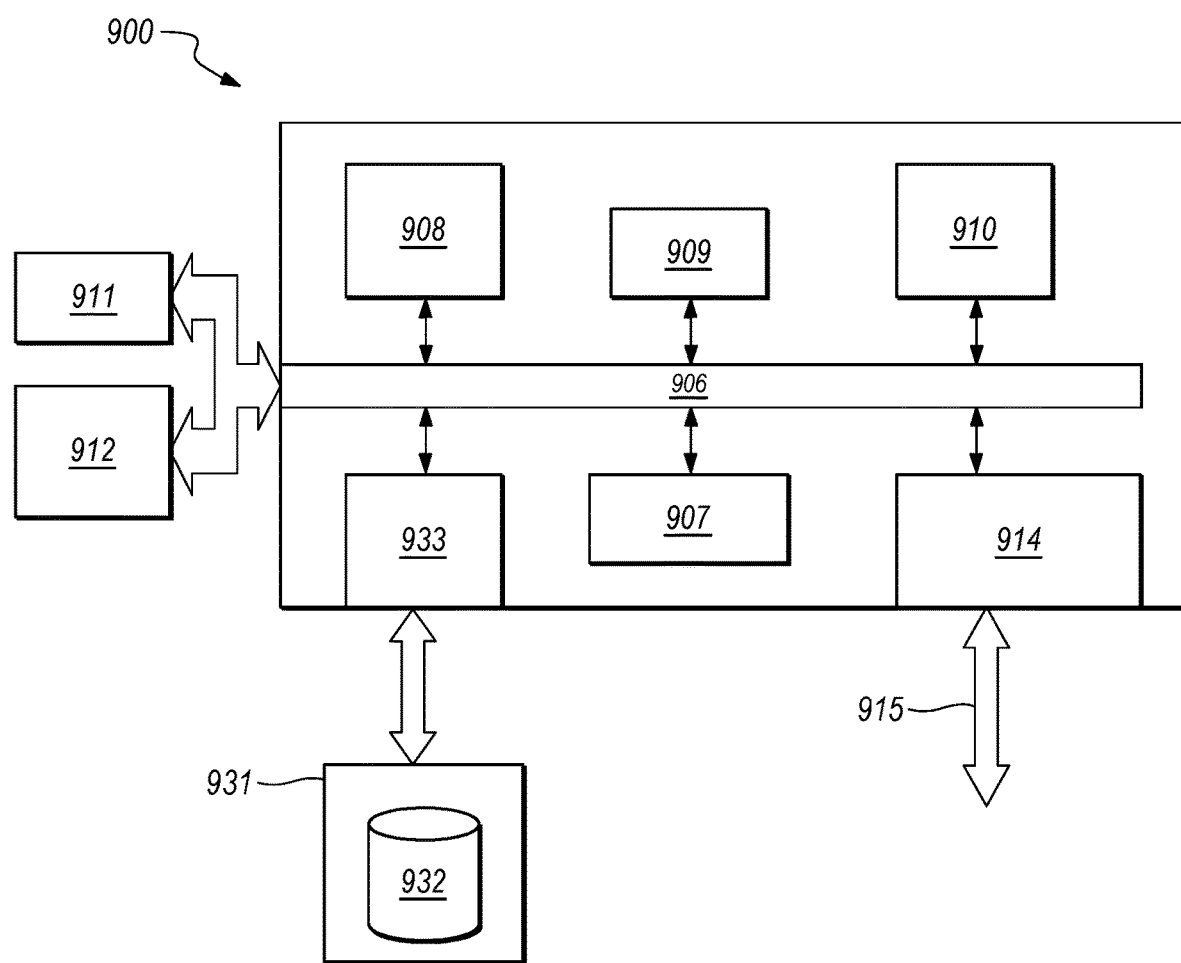
FIG. 9 is a block diagram schematically depicting an illustrative computing system, according to some embodiments.

FIG. 9 is a block diagram of an illustrative computing system 900 suitable for implementing an embodiment of the present disclosure. Computer system 900 includes a bus 906 or other communication mechanism for communicating information, which interconnects subsystems and devices, such as processor 907, system memory 908 (e.g., RAM), static storage device 909 (e.g., ROM), disk drive 910 (e.g., magnetic or optical), communication interface 914 (e.g., modem or Ethernet card), display 911 (e.g., CRT or LCD), input device 912 (e.g., keyboard), and cursor control.

According to one embodiment of the disclosure, computer system 900 performs specific operations by processor 907 executing one or more sequences of one or more instructions contained in system memory 908. Such instructions may be read into system memory 908 from another computer readable/usable medium, such as static storage device 909 or disk drive 910. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM (e.g., NAND flash, NOR flash), any other memory chip or cartridge, or any other medium from which a computer can read.

In an embodiment of the disclosure, execution of the sequences of instructions to practice the disclosure is performed by a single computer system 900. According to other embodiments of the disclosure, two or more computer systems 900 coupled by communication link 915 (e.g., LAN, PTSN, or wireless network) may perform the sequence of instructions required to practice the disclosure in coordination with one another.

Computer system 900 may transmit and receive messages, data, and instructions, including program, i.e., application code, through communication link 915 and communication interface 914. Received program code may be executed by processor 907 as it is received, and/or stored in disk drive 910, or other non-volatile storage for later execution. Database 932 in storage medium 931 may be used to store data accessible by system 900 via data interface 933.

The disclosure includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

The invention claimed is:

1. A computer implemented method for warping virtual content from two sources:
   a first source generating first virtual content based on a first pose of a display system;
   a second source generating second virtual content based on a second pose of the display system; and
   a compositor processing the first and second virtual content in a single pass in a single pipeline, wherein processing the first and second virtual content includes
      the compositor selecting a first pixel of the first virtual content to correspond to an output pixel location,
      the compositor warping the first pixel of the first virtual content based on a third pose of the display system to generate a first warped pixel,
      the compositor selecting a second pixel of the second virtual content to correspond to the output pixel location,
      the compositor warping the second pixel of the second virtual content based on the third pose of the display system to generate a second warped pixel, the compositor comparing a first depth of the first warped pixel and a second depth of the second warped pixel to identify a display pixel at the output pixel location, the compositor writing the display pixel to a memory.

2. The method of claim 1, wherein the first virtual content comprises first image information at the first pixel.

3. The method of claim 2, wherein the first image information comprises a first brightness.

4. The method of claim 2, wherein the first image information comprises a first color.

5. The method of claim 2, wherein the second virtual content comprises second image information at the second pixel.

6. The method of claim 5, wherein the second image information comprises a second brightness.

7. The method of claim 5, wherein the second image information comprises a second color.

8. The method of claim 1, wherein comparing the first depth of the first warped pixel and the second depth of the second warped pixel comprises:
determining the first depth of the first warped pixel based on the third pose of the display system;
determining the second depth of the second warped pixel based on the third pose of the display system; and
comparing the first and second depths based on the third pose of the display system.

9. The method of claim 1, wherein warping the first pixel of the first virtual content based on the third pose of the display system comprises applying a first transformation to the first pixel of the first virtual content to generate the first warped pixel.

10. The method of claim 1, wherein warping the second pixel of the second virtual content based on the third pose of the display system comprises applying a second transformation to the second pixel of the second virtual content to generate the second warped pixel.

11. The method of claim 1, wherein the first source is a first application.

12. The method of claim 11, wherein the second source is a second application different from the first application.

13. The method of claim 1, wherein the compositor is a raster operations unit.

14. The method of claim 1, further comprising:
the compositor sending the display pixel to a display unit; and
the display unit displaying an image to a user based on the display pixel.

15. The method of claim 14, wherein the display unit is a projector.

16. The method of claim 1, wherein the first virtual content is a pixel of a first virtual object.

17. The method of claim 1, wherein the second virtual content is a pixel of a second virtual object.

18. A system for warping virtual content from two sources, comprising:
a warping unit to receive first and second virtual content generated based on first and second poses of a display device by first and second sources, and generate respective first and second warped virtual content therefrom, the warping unit comprising:
a pose estimator to predict a third pose of the display device; and
a transform unit;
a compositing unit comprising a blending unit; and
a database to temporarily store warped virtual content,
wherein the system processes the first and second virtual content in a single pass in a single pipeline including
the warping unit selecting a first pixel of the first virtual content to correspond to an output pixel location,
the warping unit warping the first pixel of the first virtual content based on a third pose of the display system to generate a first warped pixel,
the warping unit selecting a second pixel of the second virtual content to correspond to the output pixel location,
the warping unit warping the second pixel of the second virtual content based on the third pose of the display system to generate a second warped pixel,
the compositing unit comparing a first depth of the first warped pixel and a second depth of the second warped pixel to identify a display pixel at the output pixel location, and
the compositing unit writing the display pixel to the database.

19. A computer program product embodied in a non-transitory computer readable medium, the computer readable medium having stored thereon a sequence of instructions which, when executed by a processor causes the processor to execute a method for warping virtual content from two sources, the method comprising:
a first source generating first virtual content based on a first pose of a display system;
a second source generating second virtual content based on a second pose of the display system; and
a compositor processing the first and second virtual content in a single pass in a single pipeline, wherein processing the first and second virtual content includes
the compositor selecting a first pixel of the first virtual content to correspond to an output pixel location,
the compositor warping the first pixel of the first virtual content based on a third pose of the display system to generate a first warped pixel,
the compositor selecting a second pixel of the second virtual content to correspond to the output pixel location,
the compositor warping the second pixel of the second virtual content based on the third pose of the display system to generate a second warped pixel,
the compositor comparing a first depth of the first warped pixel and a second depth of the second warped pixel to identify a display pixel at the output pixel location, and
the compositor writing the display pixel to a memory.

* * * * *